(12) United States Patent
Zhang et al.

(10) Patent No.: US 12,254,537 B2
(45) Date of Patent: Mar. 18, 2025

(54) SYSTEMS AND METHODS FOR IMAGE RECONSTRUCTION IN POSITRON EMISSION TOMOGRAPHY

(71) Applicant: SHANGHAI UNITED IMAGING INTELLIGENCE CO., LTD., Shanghai (CN)

(72) Inventors: Yang Zhang, Shanghai (CN); Shu Liao, Shanghai (CN); Liuchun He, Shanghai (CN); Zilin Deng, Shanghai (CN)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 0 days.

(21) Appl. No.: 18/175,492

(22) Filed: Feb. 27, 2023

(65) Prior Publication Data

US 2023/0206517 A1    Jun. 29, 2023

Related U.S. Application Data

(63) Continuation of application No. 16/858,803, filed on Apr. 27, 2020, now Pat. No. 11,593,977.

(30) Foreign Application Priority Data

Apr. 28, 2019 (CN) .......................... 201910352350.7

(51) Int. Cl.
*G06T 11/00* (2006.01)
*G06T 7/00* (2017.01)

(52) U.S. Cl.
CPC .......... *G06T 11/005* (2013.01); *G06T 7/0012* (2013.01); *G06T 2207/10104* (2013.01); *G06T 2207/20081* (2013.01)

(58) Field of Classification Search
CPC ................. G06T 11/005; G06T 7/0012; G06T 2207/10104; G06T 2207/20081
See application file for complete search history.

(56) References Cited

U.S. PATENT DOCUMENTS

| 2009/0072154 A1* | 3/2009 | Watson ................. A61B 6/037 250/363.03 |
|---|---|---|
| 2015/0093004 A1 | 4/2015 | Ye |

(Continued)

FOREIGN PATENT DOCUMENTS

| CN | 107464270 A | 12/2017 |
|---|---|---|
| CN | 107481297 A | 12/2017 |

(Continued)

OTHER PUBLICATIONS

Wu, Zhaoxia et al., Scatter Correction of PET Based on Non-linear Statistical Estimate Method, Journal of Biomedical Engineering, 2005, 4 pages.

(Continued)

*Primary Examiner* — Andrew W Bee
*Assistant Examiner* — Winta Gebreslassie
(74) *Attorney, Agent, or Firm* — METIS IP LLC

(57) ABSTRACT

A system for PET image reconstruction is provided. The system may obtain PET data of a subject. The PET data may be associated with a plurality of coincidence events, which includes scattering events. The system may also generate a preliminary scatter sinogram relating to the scattering events based on the PET data. The system may also generate a target scatter sinogram relating to the scattering events by applying a scatter sinogram generator based on the preliminary scatter sinogram. The target scatter sinogram may have a higher image quality than the preliminary scatter sino- (Continued)

gram. The system may further reconstruct a target PET image of the subject based on the PET data and the target scatter sinogram.

18 Claims, 12 Drawing Sheets

(56) References Cited

U.S. PATENT DOCUMENTS

| | | |
|---|---|---|
| 2016/0321523 A1 | 11/2016 | Sen et al. |
| 2017/0071562 A1 | 3/2017 | Suzuki |
| 2017/0074995 A1* | 3/2017 | Laurence ............ G01T 1/20182 |
| 2017/0345189 A1 | 11/2017 | Liu et al. |
| 2018/0197317 A1 | 7/2018 | Cheng et al. |
| 2019/0066342 A1* | 2/2019 | Zhu ....................... G06T 11/005 |
| 2019/0087986 A1 | 3/2019 | Spohn et al. |
| 2019/0365341 A1 | 12/2019 | Chan et al. |
| 2020/0043163 A1 | 2/2020 | Jin et al. |
| 2020/0311914 A1 | 10/2020 | Zaharchuk et al. |
| 2021/0074036 A1 | 3/2021 | Fuchs et al. |
| 2021/0183117 A1* | 6/2021 | Berker ................. A61B 6/5205 |

FOREIGN PATENT DOCUMENTS

| | | |
|---|---|---|
| CN | 108961237 A | 12/2018 |
| CN | 109035169 A | 12/2018 |
| WO | 2013177661 A1 | 12/2013 |
| WO | 2019067524 A1 | 4/2019 |

OTHER PUBLICATIONS

Zhang, Kai et al., Beyond a Gaussian Denoiser: Residual Learning of Deep CNN for Image Denoising, IEEE Transactions on Image Processing, 26: 3142-3155, 2017.
Yannick Berker et al., Deep Scatter Estimation in PET: Fast Scatter Correction Using a Convolutional Neural Network, IEEE NSS/MIC, 2018.
Fausto Milletari et al., V-Net: Fully Convolutional Neural Networks for Volumetric Medical Image Segmentation, ARXIV, 2016, 11 pages.
Olaf Ronneberger et al., U-net: Convolutional Networks for Biomedical Image Segmentation, ARXIV, 2015, 8 pages.
Phillip Isola et al., Image to-Image Translation with Conditional Adversarial Networks, ARXIV, 2018, 17 pages.
Martin Arjovsky et al., Wasserstein GAN, ARXIV, 2017, 32 pages.
Golnaz Ghiasi et al., DropBlock: A Regularization Method for Convolutional Networks, ARXIV, 2018, 11 pages.
Nitish Sricastava et al., Dropout: A Simple Way to Prevent Neural Networks from Overfitting, The Journal of Machine Learning Research, 15: 1929-1958, 2014.

* cited by examiner

500

---

Obtaining PET data of a subject, the PET data being associated with a plurality of coincidence events, the plurality of coincidence events including scattering events — 501

Generating, based on the PET data, a preliminary scatter sinogram relating to the scattering events — 502

Generating, based on the preliminary scatter sinogram, a target scatter sinogram relating to the scattering events by applying a scatter sinogram generator — 503

Reconstructing, based on the PET data and the target scatter sinogram, a target PET image of the subject — 504

Obtaining a plurality of training samples each of which includes a sample preliminary scatter sinogram and a sample target scatter sinogram relating to sample scattering events detected in a sample PET scan of a sample subject — 801

Generating the scatter sinogram generator by training a preliminary model using the plurality of training samples. — 802

FIG. 8

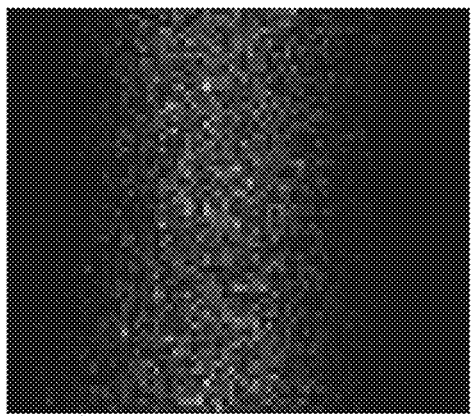
1100A
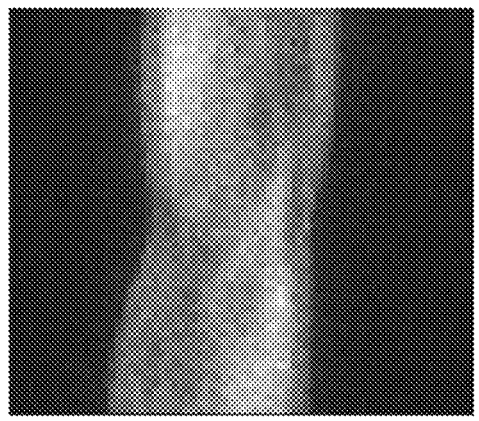
1100B
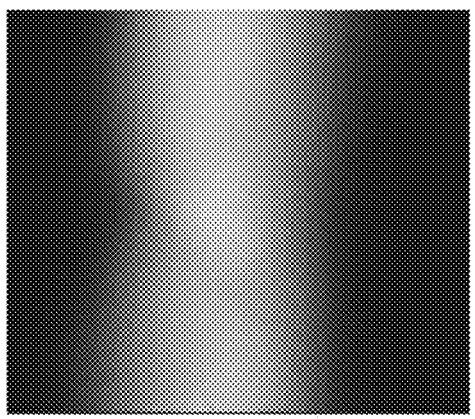
1100C
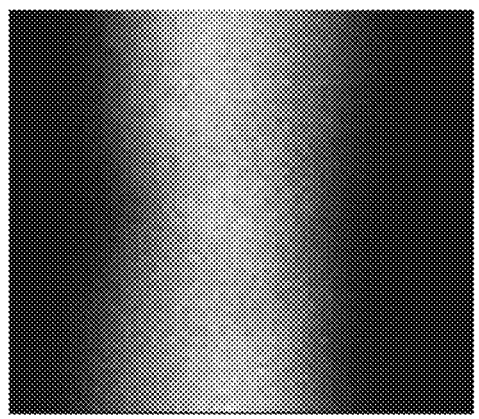
1100D
FIG. 11

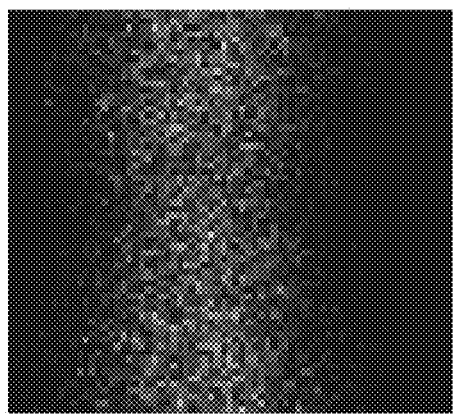
1200A
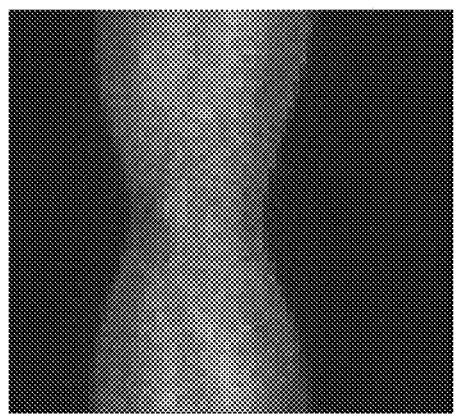
1200B
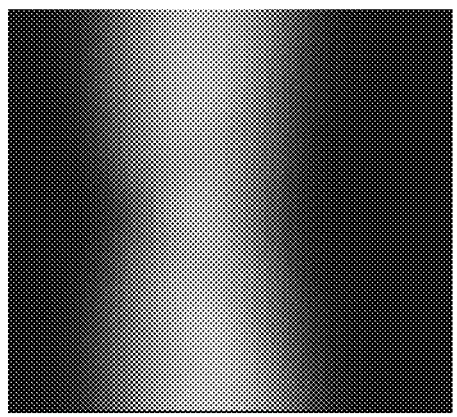
1200C
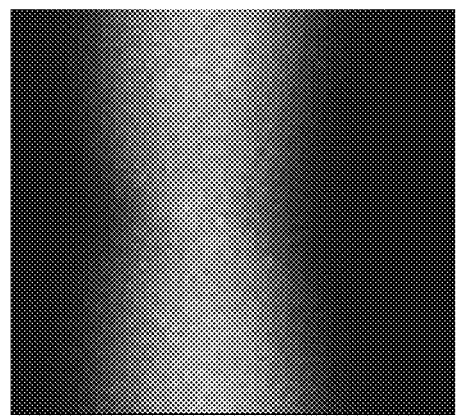
1200D
FIG. 12

SYSTEMS AND METHODS FOR IMAGE RECONSTRUCTION IN POSITRON EMISSION TOMOGRAPHY

CROSS-REFERENCE TO RELATED APPLICATIONS

This application is a continuation of U.S. patent application Ser. No. 16/858,803, filed on Apr. 27, 2020, which claims priority to Chinese Patent Application No. 201910352350.7, filed on Apr. 28, 2019, the contents of each of which are hereby incorporated by reference.

TECHNICAL FIELD

The present disclosure generally relates to image reconstruction, and more particularly, relates to systems and methods for PET image reconstruction.

BACKGROUND

Recently, PET has been widely used in clinical examination and disease diagnosis. For example, a subject may be injected with a radioactive tracer before a PET scan, and PET data of the subject may be obtained during the PET scan. The PET data may relate to a plurality of coincidence events, including true coincidence events, scattering events, and random events, detected in the PET scan. However, only the true coincidence events may accurately indicate position information of the radioactive tracer injected into the subject. In PET image reconstruction, data correction may be needed to reduce or eliminate the effect of the scattering events and/or the random events. For example, techniques, such as a Monte-Carlo Simulation algorithm, an analytical modeling technique, a source modulation algorithm, have been used to generate a scatter sinogram for scatter correction in the PET image reconstruction. Therefore, it is desirable to provide systems and methods for PET image reconstruction, thereby improving the reconstruction accuracy and/or efficiency.

SUMMARY

According to one aspect of the present disclosure, a system for PET image reconstruction is provided. The system may include at least one storage device may include a set of instructions and at least one processor configured to communicate with the at least one storage device. When executing the set of instructions, the at least one processor may be configured to direct the system to obtain PET data of a subject. The PET data may be associated with a plurality of coincidence events including scattering events. The at least one processor may also be configured to direct the system to generate a preliminary scatter sinogram relating to the scattering events based on the PET data, and generate a target scatter sinogram relating to the scattering events by applying a scatter sinogram generator based on the preliminary scatter sinogram. The target scatter sinogram may have a higher image quality than the preliminary scatter sinogram. The at least one processor may further be configured to direct the system to reconstruct a target PET image of the subject based on the PET data and the target scatter sinogram.

In some embodiments, the at least one processor may be configured to direct the system to generate a preliminary PET image of the subject based on the PET data, and generate the preliminary scatter sinogram based on the preliminary PET image. The target PET image may include less scattering noises than the preliminary PET image.

In some embodiments, the at least one processor may be configured to direct the system to obtain an attenuation map of the subject, and generate the preliminary scatter sinogram based on the attenuation map and the preliminary PET image.

In some embodiments, the preliminary scatter sinogram may be generated based on the attenuation map and the preliminary PET image according to a Monte-Carlo simulation algorithm.

In some embodiments, the plurality of coincidence events may further include true coincidence events. The at least one processor may be configured to direct the system to generate a prompt sinogram and a delay sinogram based on PET data, and determine a true sinogram relating the true coincidence events and the scattering events based on the prompt sinogram and the delay sinogram. The at least one processor may further be configured to direct the system to generate the preliminary PET image of the subject based on the true sinogram.

In some embodiments, the at least one processor may be configured to direct the system to generate the target scatter sinogram by processing the preliminary scatter sinogram and the true sinogram using the scatter sinogram generator.

In some embodiments, the at least one processor may be configured to direct the system to normalize the preliminary scatter sinogram and the true sinogram, and generate a concatenated sinogram by concatenating the normalized preliminary scatter sinogram and the normalized true sinogram. The at least one processor may further be configured to direct the system to generate the target scatter sinogram by processing the concatenated sinogram using the scatter sinogram generator.

In some embodiments, the at least one processor may be configured to direct the system to generate an updated PET image of the subject based on the target scatter sinogram and the PET data, and generate a final scatter correction sinogram based on the target scatter sinogram and the updated PET image. The at least one processor may further be configured to direct the system to reconstruct the target PET image of the subject based on the PET data and the final scatter correction sinogram.

In some embodiments, the at least one processor may be configured to direct the system to generate a scatter correction sinogram by correcting the target scatter sinogram, and generate an updated PET image of the subject based on the scatter correction sinogram and the PET data. The generating a final scatter correction sinogram based on the target scatter sinogram and the updated PET image may include generating the final scatter correction sinogram by iteratively updating the scatter correction sinogram based on the updated PET image.

In some embodiments, the scatter sinogram generator may include a plurality of sequentially connected layers. The plurality of sequentially connected layers may include a plurality of residual layers. At least one of the plurality of residual layers may include a first residual block and a second residual block. The first residual block may be connected to a next layer via a downsampling path, and the second residual block may be connected to a previous layer via an upsampling path.

In some embodiments, the scatter sinogram generator may be trained according to a model training process. The training process may include obtaining a plurality of training samples, and generating the scatter sinogram generator by training a preliminary model using the plurality of training samples. Each of the training samples may include a sample preliminary scatter sinogram and a sample target scatter sinogram relating to sample scattering events detected in a sample PET scan of a sample subject. The sample target scatter sinogram may have a higher image quality than the sample preliminary scatter sinogram.

In some embodiments, the image quality of a certain scatter sinogram may relate to at least one of a noise level, a contrast ratio, or a smoothness of the certain scatter sinogram. The certain scatter sinogram may be the target scatter sinogram or the preliminary scatter sinogram.

According to another aspect of the present disclosure, a system is provided. The system may include at least one storage device storing a set of instructions for generating a scatter sinogram generator and at least one processor configured to communicate with the at least one storage device. When executing the set of instructions, the at least one processor may be configured to direct the system to obtain a plurality of training samples, and generate the scatter sinogram generator by training a preliminary model using the plurality of training samples. Each of training samples may include a sample preliminary scatter sinogram and a sample target scatter sinogram relating to sample scattering events detected in a sample PET scan of a sample subject. The sample target scatter sinogram may have a higher quality than the sample preliminary scatter sinogram.

In some embodiments, each of the plurality of training samples may include a sample true sinogram relating to sample true coincidence events and the sample scattering events detected in the corresponding sample PET scan.

In some embodiments, for each of the plurality of training samples, the at least one processor may be configured to direct the system to normalize the sample preliminary scatter sinogram, the sample target scatter sinogram, and the sample true sinogram of the training sample, and generate a cropped sample preliminary scatter sinogram, a cropped sample target scatter sinogram, a cropped sample true sinogram by cropping the normalized sample preliminary scatter sinogram, the normalized sample target scatter sinogram, and the normalized sample true sinogram of the training sample, respectively. For each of the plurality of training samples, the at least one processor may be configured to direct the system to generate a sample concatenated sinogram by concatenating the cropped sample preliminary scatter sinogram and the cropped sample true sinogram. For each of the plurality of training samples, the at least one processor may be configured to direct the system to generate the scatter sinogram generator by training the preliminary model using the sample concatenated sinogram and the cropped sample target scatter sinogram of each of the plurality of training samples.

In some embodiments, the at least one processor may be configured to direct the system to generate a preliminary scatter sinogram generator by training the preliminary model using the plurality of training samples according to a first gradient descent algorithm. The at least one processor may be configured to direct the system to generate the scatter sinogram generator by training the preliminary scatter sinogram generator using the plurality of training samples according to a second gradient descent algorithm. The second gradient descent algorithm may be different from the first gradient descent algorithm.

In some embodiments, the first gradient descent algorithm may be an Adam optimization algorithm, and the second gradient descent algorithm may be a stochastic gradient descent (SGD)+ Momentum optimization algorithm.

In some embodiments, the at least one processor may be configured to direct the system to determine a first learning rate with respect to the first gradient descent algorithm according to a learning rate range test technique, and determine a second learning rate with respect to the second gradient descent algorithm according to a cycle learning rate technique. The generating a preliminary scatter sinogram generator by training the preliminary model using the plurality of training samples according to a first gradient descent algorithm may include generating the preliminary scatter sinogram generator by training the preliminary model using the plurality of training samples according to the first gradient descent algorithm and the first learning rate. The generating the scatter sinogram generator by training the preliminary scatter sinogram generator using the plurality of training samples according to a second gradient descent algorithm may include generating the scatter sinogram generator by training the preliminary scatter sinogram generator using the plurality of training samples according to the second gradient descent algorithm and the second learning rate.

In some embodiments, the scatter sinogram generator may include a plurality of sequentially connected layers. The plurality of sequentially connected layers may include a plurality of residual layers. At least one of the plurality of residual layers may include a first residual block and a second residual block. The first residual block may be connected to a next layer via a downsampling path, and the second residual block may be connected to a previous layer via an upsampling path.

According to another aspect of the present disclosure, a method for positron emission tomography (PET) image reconstruction is provided. The method may include obtaining PET data of a subject, the PET data being associated with a plurality of coincidence events. The plurality of coincidence events may include scattering events. The method may also include generating a preliminary scatter sinogram relating to the scattering events based on the PET data, and generating a target scatter sinogram relating to the scattering events by applying a scatter sinogram generator based on the preliminary scatter sinogram. The target scatter sinogram may have a higher image quality than the preliminary scatter sinogram. The method may include reconstructing a target PET image of the subject based on the PET data and the target scatter sinogram.

According to another aspect of the present disclosure, a method for generating a scatter sinogram generator is provided. The method may include obtaining a plurality of training samples, and generating the scatter sinogram generator by training a preliminary model using the plurality of training samples. Each of the training samples may include a sample preliminary scatter sinogram and a sample target scatter sinogram relating to sample scattering events detected in a sample PET scan of a sample subject. The sample target scatter sinogram may have a higher quality than the sample preliminary scatter sinogram.

According to another aspect of the present disclosure, a non-transitory computer-readable storage medium including instructions is provided. When accessed by at least one processor of a system for positron emission tomography (PET) image reconstruction, the instructions cause the system to perform a method. The method may include obtaining PET data of a subject, the PET data being associated with a plurality of coincidence events. The plurality of coincidence events may include scattering events. The method may also include generating a preliminary scatter sinogram relating to the scattering events based on the PET data, and generating a target scatter sinogram relating to the scattering events by applying a scatter sinogram generator based on the preliminary scatter sinogram. The target scatter sinogram may have a higher image quality than the preliminary scatter sinogram. The method may include reconstructing a target PET image of the subject based on the PET data and the target scatter sinogram.

According to still another aspect of the present disclosure, a non-transitory computer-readable storage medium including instructions is provided. When accessed by at least one processor of a system for generating a scatter sinogram generator, the instructions cause the system to perform a method. The method may include obtaining a plurality of training samples, and generating the scatter sinogram generator by training a preliminary model using the plurality of training samples. Each of the training samples may include a sample preliminary scatter sinogram and a sample target scatter sinogram relating to sample scattering events detected in a sample PET scan of a sample subject. The sample target scatter sinogram may have a higher quality than the sample preliminary scatter sinogram.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for reconstructing a target PET image of a subject according to some embodiments of the present disclosure;

FIG. 8 is a flowchart illustrating an exemplary process for generating a scatter sinogram generator according to some embodiments of the present disclosure;

FIG. 11 is a schematic diagram illustrating exemplary sinograms of a first subject according to some embodiments of the present disclosure; and FIG. 12 is a schematic diagram illustrating exemplary sinograms of a second subject according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
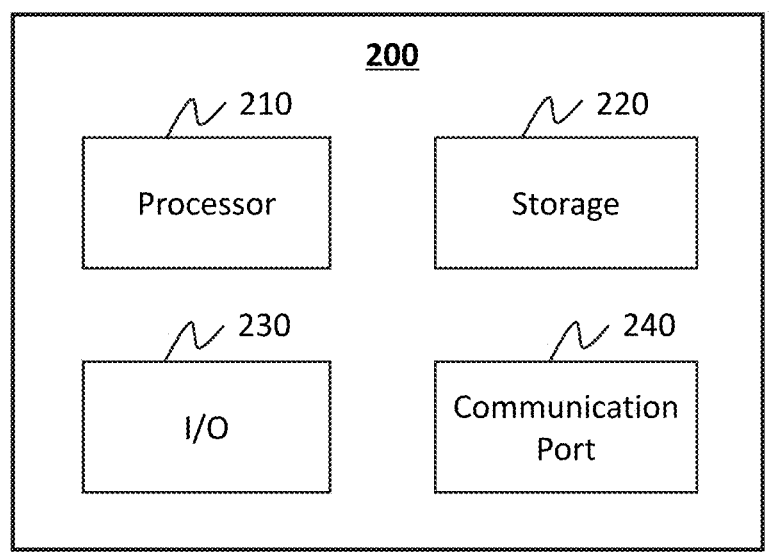
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive biomedical imaging, such as for disease diagnostic or research purposes. In some embodiments, the systems may include a single modality imaging system and/or a multi-modality imaging system. The single modality imaging system may include, for example, a positron emission tomography (PET) system. The multi-modality imaging system may include, for example, a positron emission tomography-computed tomography (PET-CT) system, a positron emission tomography-magnetic resonance imaging (PET-MRI) system. It should be noted that the imaging system described below is merely provided for illustration purposes, and not intended to limit the scope of the present disclosure.

The term "imaging modality" or "modality" as used herein broadly refers to an imaging method or technology that gathers, generates, processes, and/or analyzes imaging information of a subject. The subject may include a biological object and/or a non-biological object. The biological object may be a human being, an animal, a plant, or a portion thereof (e.g., a cell, a tissue, an organ, etc.). In some embodiments, the subject may be a man-made composition of organic and/or inorganic matters that are with or without life.

An aspect of the present disclosure relates to systems and methods for PET image reconstruction. The systems and methods may obtain PET data of a subject. The PET data may be associated with a plurality of coincidence events, including scattering events, detected in a PET scan of the subject. The systems and methods may generate, based on the PET data, a preliminary scatter sinogram relating to the scattering events. The systems and methods may also generate, based on the preliminary scatter sinogram, a target scatter sinogram relating to the scattering events using a scatter sinogram generator. The target scatter sinogram may have a higher image quality (e.g., a lower noise level) than the preliminary scatter sinogram. The systems and methods may further reconstruct a target PET image of the subject based on the PET data and the target scatter sinogram.

According to some embodiments of the present disclosure, the systems and methods may first generate the preliminary scatter sinogram of a relatively low image quality (e.g., a high noise level) using a small portion of the coincidence events of the PET data, and then generate, using the scatter sinogram generator, the target scatter sinogram with a higher image quality (e.g., a reduced noise level) than the preliminary scatter sinogram. For example, the preliminary scatter sinogram may be generated according to a Monte-Carlo Simulation algorithm, which may simulate the interaction between the subject and photons and generate the preliminary scatter sinogram by building a statistical model. Normally, the Monte-Carlo Simulation algorithm may simulate a scatter sinogram having a desired image quality (e.g., a low noise level) based on a large amount of coincidence events. For example, if other conditions remain the same, the more coincidence events are used in the Monte-Carlo Simulation, the higher accuracy the resulting scatter sinogram may have. However, using more coincidence events in the Monte-Carlo Simulation may cost more computational resources (e.g., a storage space, system load indicating the amount of computational work involved), call for a larger number (or count) of computer devices and/or more advanced computing devices, and/or cause a longer scanning or image reconstruction time in clinical examinations and/or treatment. The systems and methods as disclosed herein may be used to generate the target scatter sinogram with an improved reconstruction efficiency by taking advantage of a reduced computational complexity and/or resources needed for generating the preliminary scatter sinogram. For example, the generation of a scatter sinogram having a similar image quality to the target scatter sinogram may cost less than 1 second using the systems and methods disclosed herein, compared to using conventional simulation algorithms which may take more time (e.g., 4 seconds, 10 seconds).

Another aspect of the present disclosure relates to systems and methods for generating a scatter sinogram generator. The systems and methods may obtain a plurality of training samples each of which includes a sample preliminary scatter sinogram and a sample target scatter sinogram relating to sample scattering events detected in a sample PET scan of a sample subject, wherein the sample target scatter sinogram may have a higher image quality than the sample preliminary scatter sinogram. The systems and methods may further generate the scatter sinogram generator by training a preliminary model using the plurality of training samples.

In some embodiments, the training of the preliminary model may include two or more training stages in which different gradient descent algorithms and/or different learning rate strategies are adopted, which may facilitate the convergence of the preliminary model and improve the accuracy and/or the generalization ability of the resulting scatter sinogram generator. In addition, a specially designed model configuration is provided in the present disclosure. For example, the preliminary model may be a U-shaped model including a plurality of residual blocks. Compared with a conventional U-net model that mainly uses convolution blocks for feature extraction, the preliminary model disclosed herein may achieve an improved training accuracy and efficiency because the residual blocks may better preserve information or features, avoid the problem of vanishing gradient, and facilitate model convergence in model training.

Figure 1:
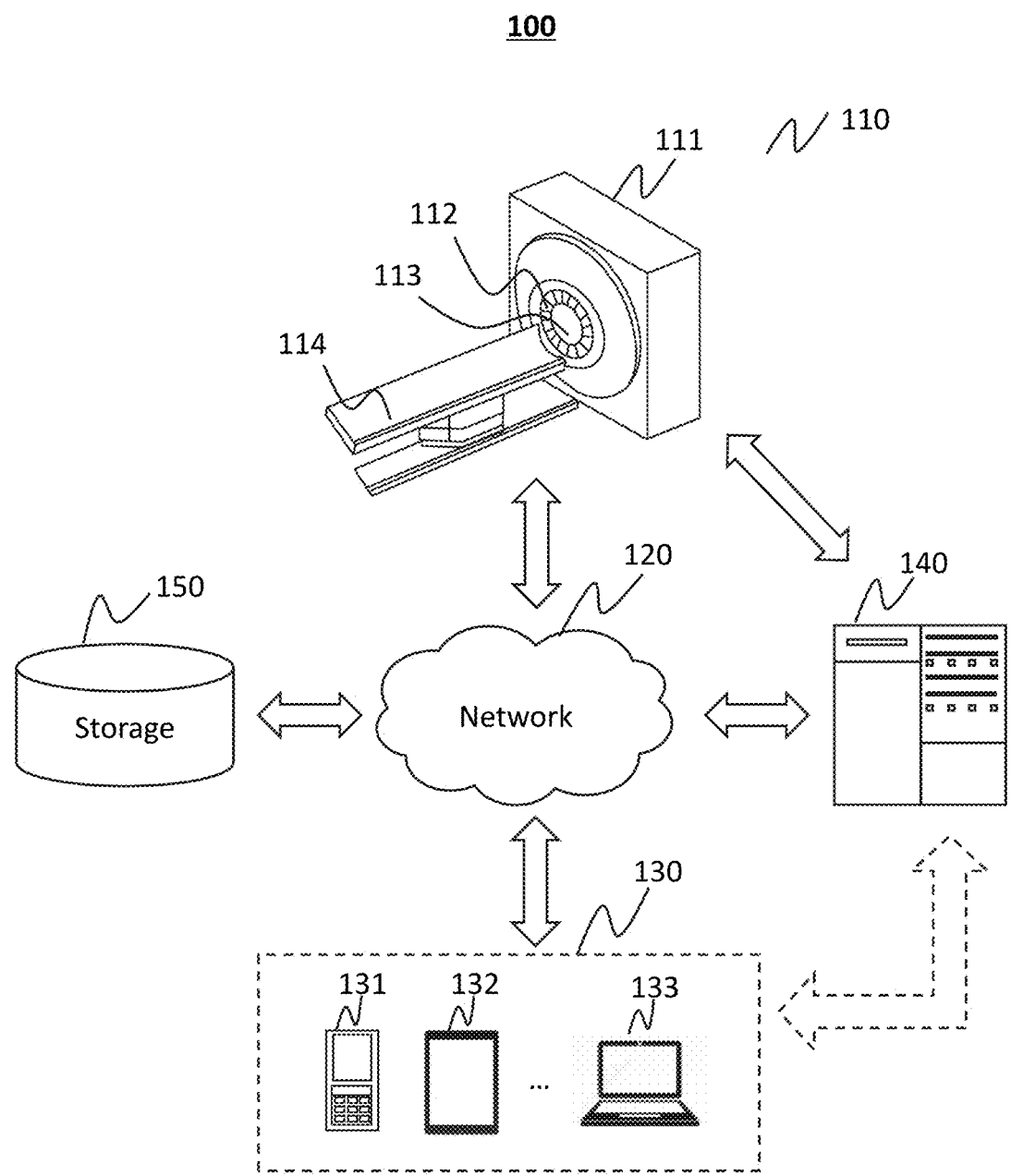
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown, the imaging system 100 may include a scanner 110, a network 120, one or more terminals 130, a processing device 140, and a storage device 150. In some embodiments, the scanner 110, the terminal(s) 130, the processing device 140, and/or the storage device 150 may be connected to and/or communicate with each other via a wireless connection (e.g., the network 120), a wired connection, or a combination thereof. The connection between the components of the imaging system 100 may be variable. Merely by way of example, the scanner 110 may be connected to the processing device 140 through the network 120, as illustrated in FIG. 1. As another example, the scanner 110 may be connected to the processing device 140 directly. As a further example, the storage device 150 may be connected to the processing device 140 through the network 120, as illustrated in FIG. 1, or connected to the processing device 140 directly. As still a further example, a terminal 130 may be connected to the processing device 140 through the network 120, as illustrated in FIG. 1, or connected to the processing device 140 directly.

The scanner 110 may generate or provide image data related to a subject via scanning the subject. In some embodiments, the subject may include a biological object and/or a non-biological object. For example, the subject may include a specific portion of a body, such as a head, a thorax, an abdomen, or the like, or a combination thereof. In some embodiments, the scanner 110 may include a single-modality scanner (e.g., a CT scanner, a PET scanner) and/or multi-modality scanner (e.g., a PET-CT scanner, a PET-MRI scanner) as described elsewhere in this disclosure.

In some embodiments, the scanner 110 may include a gantry 111, a detector 112, a detecting region 113, and a scanning table 114. The gantry 111 may support the detector 112. The detector 112 may detect radiation events (e.g., gamma photons) emitted from the detection region 113. In some embodiments, the detector 112 may include one or more detector units. The detector units may be assembled in any suitable manner, for example, a ring, an arc, a rectangle, an array, or the like, or any combination thereof. In some embodiments, a detector unit may include one or more crystal elements (e.g., scintillators) and/or one or more photomultipliers (e.g., silicon photomultiplier (SiPM), photomultiplier tube (PMT)). The scanning table 114 may transport the subject into and out of, and facilitate the positioning of the subject in the detection region 113. In some embodiments, the detected radiation events may be stored or archived in a storage device (e.g., the storage device 150), displayed on a display, or transferred to an external storage device via a cable, or a wired or wireless network (e.g., the network 120). In some embodiments, a user may control the scanner 110 via the processing device 140 and/or the terminal(s) 130.

In some embodiments, the scanner 110 may be a PET scanner. Before scanning, a radioactive tracer isotope may be injected into the subject to be scanned. One or more atoms of the tracer isotope may be chemically incorporated into biologically active molecules in the subject. The active molecules may become concentrated in a tissue of interest within the subject. The tracer isotope may undergo positron emission decay and emit positrons. A positron may travel a short distance (e.g., about 1 mm) within a tissue of interest, lose kinetic energy, and interact with an electron of the subject. The positron and the electron may annihilate and produce a pair of annihilation photons. The pair of annihilation photons (or radiation rays) may move in approximately opposite directions. A plurality of radiation rays may reach the detector 112 and be detected by the detector 112.

In some embodiments, one or more coincidence events may be determined based on the interaction positions and the interaction times of a plurality of received photons. If two photons are received and interact with two scintillators of two detector units within a certain coincidence time window (e.g., 1 nanosecond, 2 nanoseconds, 5 nanoseconds, 10 nanoseconds, 20 nanoseconds, etc.), the two photons may be deemed to come from the same annihilation, and regarded as a coincidence event (or coincident event). The coincidence event may be assigned to a line of response (LOR) joining the two relevant detector units that have detected the coincidence event.

A coincident event may be a true coincident event, a random event, a scattering event, etc. A true coincident event occurs when two photons from a single annihilation event are detected by a pair of detector units along an LOR within a certain coincidence time window. A random event occurs when two photons from two separate annihilation events detected by a pair of detector units are deemed as a coincident event along an LOR within the certain coincidence time window. A scattering event occurs when at least one of two photons detected by a pair of detector units along an LOR within the certain coincidence time window has undergone a Compton scattering prior to its detection.

The network 120 may include any suitable network that can facilitate the exchange of information and/or data for the imaging system 100. In some embodiments, one or more components of the imaging system 100 (e.g., the scanner 110, the processing device 140, the storage device 150, the terminal(s) 130) may communicate information and/or data with one or more other components of the imaging system 100 via the network 120. For example, the processing device 140 may obtain PET data of a subject from the scanner 110 via the network 120. As another example, the processing device 140 may obtain user instruction(s) from the terminal(s) 130 via the network 120. The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may be connected to and/or communicate with the scanner 110, the processing device 140, and/or the storage device 150. For example, the terminal(s) 130 may display a target PET image of the subject. In some embodiments, the terminal(s) 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 130 may include an input device, an output device, etc. In some embodiments, the terminal(s) 130 may be part of the processing device 140.

The processing device 140 may process data and/or information obtained from the scanner 110, the storage device 150, the terminal(s) 130, or other components of the imaging system 100. In some embodiments, the processing device 140 may be a single server or a server group. The server group may be centralized or distributed. For example, the processing device 140 may generate a scatter sinogram generator by training a preliminary model using a plurality of training samples. As another example, the processing device 140 may apply the scatter sinogram generator to generate a target scatter sinogram of a subject. In some embodiments, the scatter sinogram generator may be generated by a processing device, while the application of the scatter sinogram generator may be performed on a different processing device. In some embodiments, the scatter sinogram generator may be generated by a processing device of a system different from the imaging system 100 or a server different from the processing device 140 on which the application of the scatter sinogram generator is performed. For instance, the scatter sinogram generator may be generated by a first system of a vendor who provides and/or maintains such a scatter sinogram generator, while the generation of the target scatter sinogram may be performed on a second system of a client of the vendor. In some embodiments, the application of the scatter sinogram generator may be performed online in response to a request for generating the target scatter sinogram. In some embodiments, the target scatter sinogram may be generated offline.

In some embodiments, the scatter sinogram generator may be generated and/or updated (or maintained) by, e.g., the manufacturer of the scanner 110 or a vendor. For instance, the manufacturer or the vendor may load the scatter sinogram generator into the imaging system 100 or a portion thereof (e.g., the processing device 140) before or during the installation of the scanner 110 and/or the processing device 140, and maintain or update the scatter sinogram generator from time to time (periodically or not). The maintenance or update may be achieved by installing a program stored on a storage device (e.g., a compact disc, a USB drive, etc.) or retrieved from an external source (e.g., a server maintained by the manufacturer or vendor) via the network 120. The program may include a new model (e.g., a new scatter sinogram generator) or a portion of a model that substitute or supplement a corresponding portion of the model.

In some embodiments, the processing device 140 may be local to or remote from the imaging system 100. For example, the processing device 140 may access information and/or data from the scanner 110, the storage device 150, and/or the terminal(s) 130 via the network 120. As another example, the processing device 140 may be directly connected to the scanner 110, the terminal(s) 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 140 may be implemented by a computing device 200 having one or more components as described in connection with FIG. 2.

In some embodiments, the processing device 140 may include one or more processors (e.g., single-core processor(s) or multi-core processor(s)). Merely by way of example, the processing device 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 150 may store data, instructions, and/or any other information. In some embodiments, the storage device 150 may store data obtained from the processing device 140, the terminal(s) 130, and/or the scanner 110. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the imaging system 100 (e.g., the processing device 140, the terminal(s) 130). One or more components of the imaging system 100 may access the data or instructions stored in the storage device 150 via the network 120. In some embodiments, the storage device 150 may be part of the processing device 140.

It should be noted that the above description of the imaging system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the imaging system 100 may include one or more additional components. Additionally or alternatively, one or more components of the imaging system 100 described above may be omitted. As another example, two or more components of the imaging system 100 may be integrated into a single component.

FIG. 2 is a schematic diagram illustrating exemplary hardware and/or software components of a computing device 200 according to some embodiments of the present disclosure. The computing device 200 may be used to implement any component of the imaging system 100 as described herein. For example, the processing device 140 and/or the terminal(s) 130 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 2, the computing device 200 may include a processor 210, a storage device 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the scanner 110, the terminal(s) 130, the storage device 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage device 220 may store data/information obtained from the scanner 110, the terminal(s) 130, the storage device 150, and/or any other component of the imaging system 100. In some embodiments, the storage device 220 may include a mass storage device, a removable storage device, a volatile read-and-write memory, a read-only memory (ROM), or the like, or any combination thereof. In some embodiments, the storage device 220 may store one or more programs and/or instructions to perform exemplary methods described in the present disclosure. For example, the storage device 220 may store a program for the processing device 140 to execute to generate a scatter sinogram generator.

The I/O 230 may input and/or output signals, data, information, etc. In some embodiments, the I/O 230 may enable a user interaction with the processing device 140. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 140) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), or a touch screen), a speaker, a printer, or the like, or a combination thereof.

The communication port 240 may be connected to a network (e.g., the network 120) to facilitate data communications. The communication port 240 may establish connections between the processing device 140 and the scanner 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
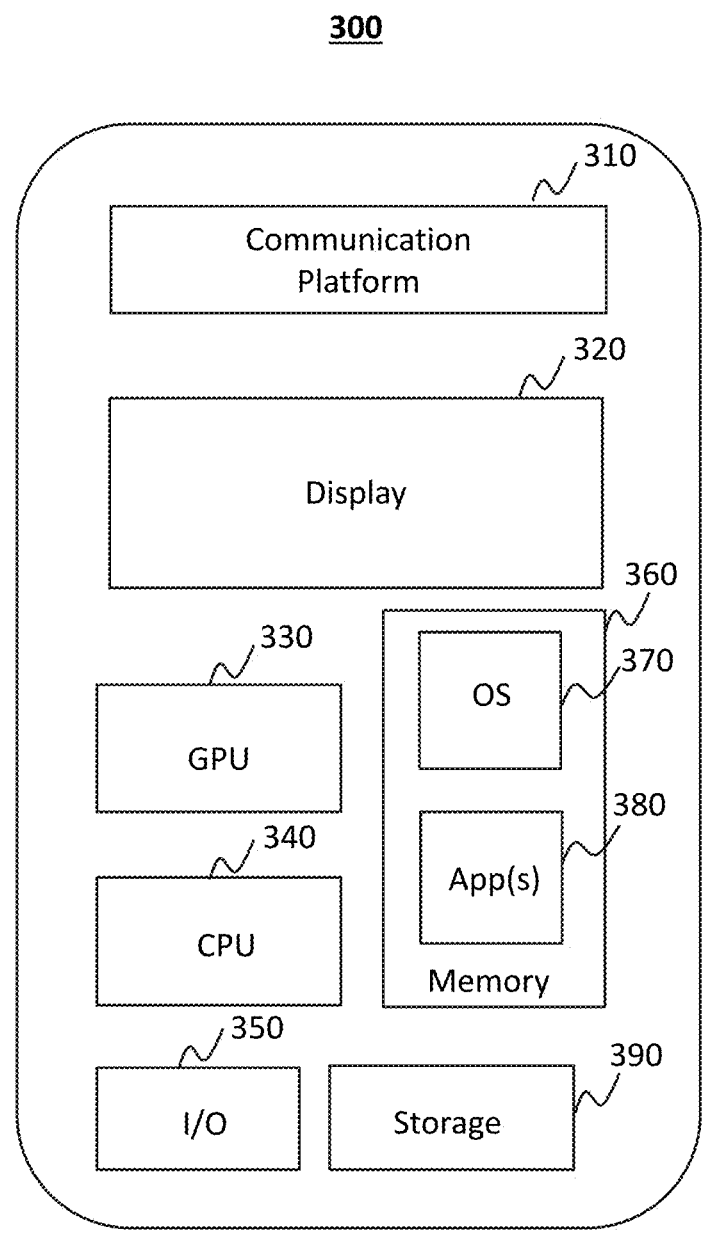
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal 130 and/or the processing device 140) of the imaging system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
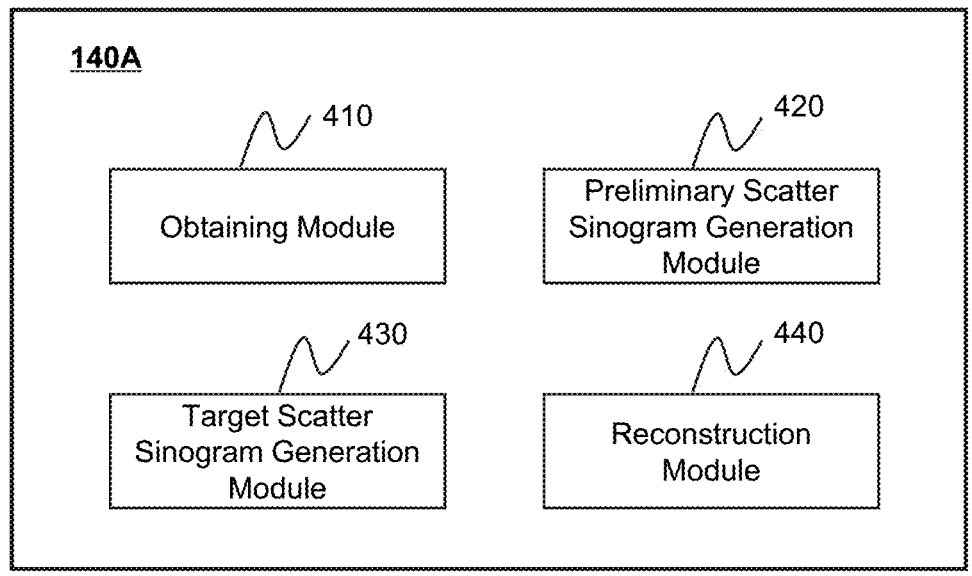
FIGS. 4A and 4B are block diagrams illustrating exemplary processing devices according to some embodiments of the present disclosure.
Figure 4B:
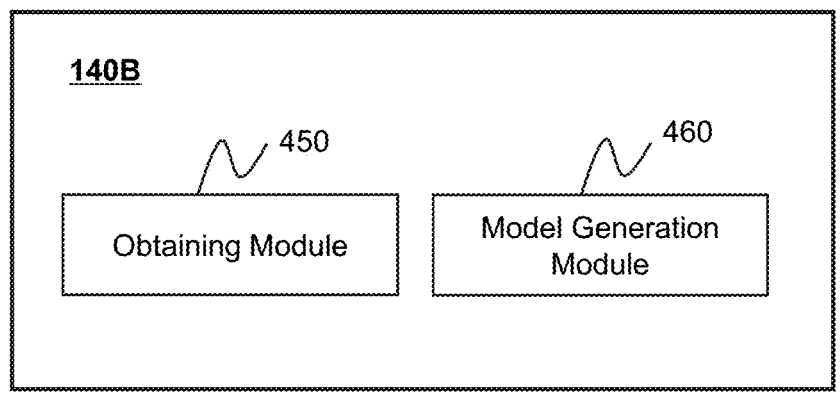

FIGS. 4A and 4B are block diagrams illustrating exemplary processing devices 140A and 140B according to some embodiments of the present disclosure. The processing devices 140A and 140B may be exemplary processing devices 140B as described in connection with FIG. 1. In some embodiments, the processing device 140A may be configured to apply a scatter sinogram generator in reconstructing a target PET image of a subject. The processing device 140B may be configured to generate a scatter sinogram generator by model training. In some embodiments, the processing devices 140A and 140B may be respectively implemented on a processing unit (e.g., a processor 210 illustrated in FIG. 2 or a CPU 340 as illustrated in FIG. 3). Merely by way of example, the processing devices 140A may be implemented on a CPU 340 of a terminal device, and the processing device 140B may be implemented on a computing device 200. Alternatively, the processing devices 140A and 140B may be implemented on a same computing device 200 or a same CPU 340. For example, the processing devices 140A and 140B may be implemented on a same computing device 200.

As shown in FIG. 4A, the processing device 140A may include an obtaining module 410, a preliminary scatter sinogram generation module 420, a target scatter sinogram generation module 430, and a reconstruction module 440.

The obtaining module 410 may be configured to obtain PET data of a subject. The PET data may relate to a plurality of coincidence events detected in a PET scan of the subject. The coincidence events may include true coincidence events, random events, scattering events, etc. More descriptions regarding the obtaining of the PET data may be found elsewhere in the present disclosure. See, e.g., operation 501 in FIG. 5 and relevant descriptions thereof.

The preliminary scatter sinogram generation module 420 may be configured to generate a preliminary scatter sinogram relating to the scattering events based on the PET data. A preliminary scatter sinogram refers to a scatter sinogram including information of the scattering events (or a portion thereof), which is simulated from the PET data of the subject. The preliminary scatter sinogram may be used to generate a target scatter sinogram, which has a higher image quality than the preliminary scatter sinogram. In some embodiments, the preliminary scatter sinogram may correspond to a first count of coincidence events of the plurality of coincidence events, and the target scatter sinogram may correspond to a second count of coincidence events of the coincidence events. The second count may be higher than the first count. More descriptions regarding the generation of the preliminary scatter sinogram may be found elsewhere in the present disclosure. See, e.g., operation 502 in FIG. 5 and relevant descriptions thereof.

The target scatter sinogram generation module 430 may be configured to generate the target scatter sinogram relating to the scattering events by applying a scatter sinogram generator based on the preliminary scatter sinogram. The scatter sinogram generator refers to a model or an algorithm configured to generate a target scatter sinogram with a desired image quality based on the preliminary scatter sinogram. In some embodiments, the input of the scatter sinogram generator may include the preliminary scatter sinogram itself or a combination of the preliminary scatter sinogram and a true sinogram relating to the true coincidence events and the scattering events detected in the PET scan of the subject. Optionally, the preliminary scatter sinogram and/or the true sinogram may be preprocessed to generate the input of the scatter sinogram generator. More descriptions regarding the generation of the target scatter sinogram may be found elsewhere in the present disclosure. See, e.g., operation 503 in FIG. 5 and relevant descriptions thereof.

The reconstruction module 440 may be configured to reconstruct the target PET image of the subject based on the PET data and the target scatter sinogram. In some embodiments, the reconstruction module 440 may generate the target PET image based on the target scatter sinogram and the PET data according to a PET image reconstruction algorithm (e.g., an OSEM algorithm, an FBP algorithm, an MLAA algorithm). More descriptions regarding the reconstruction of the target PET image may be found elsewhere in the present disclosure. See, e.g., operation 504 in FIG. 5 and relevant descriptions thereof.

As shown in FIG. 4B, the processing device 140B may include an obtaining module 450 and a model generation module 460.

The obtaining module 450 may be configured to obtain a plurality of training samples. Each of the training samples may include a sample preliminary scatter sinogram and a sample target scatter sinogram relating to sample scattering events detected in a sample PET scan of a sample subject, wherein the sample target scatter sinogram may have a higher image quality (e.g., a lower noise level) than the sample preliminary scatter sinogram. More descriptions regarding the obtaining of the training samples may be found elsewhere in the present disclosure. See, e.g., operation 801 in FIG. 8 and relevant descriptions thereof.

The model generation module 460 may be configured to generate the scatter sinogram generator by training a preliminary model using the plurality of training samples. The preliminary model may be of any type of machine learning model (e.g., a deep learning model). In some embodiments, the training of the preliminary model may be performed based on one or more gradient descent algorithms, e.g., an Adam optimization algorithm, a stochastic gradient descent (SGD)+ Momentum optimization algorithm. In some embodiments, the training of the preliminary model may include one or more training stages, for example, two training stages. More descriptions regarding the generation of the scatter sinogram generator may be found elsewhere in the present disclosure. See, e.g., operation 802 in FIG. 8 and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140A and/or the processing device 140B may share two or more of the modules, and any one of the modules may be divided into two or more units. For instance, the processing devices 140A and 140B may share a same obtaining module; that is, the obtaining module 410 and the obtaining module 450 are a same module. In some embodiments, the processing device 140A and/or the processing device 140B may include one or more additional modules, such as a storage module (not shown) for storing data. In some embodiments, the processing device 140A and the processing device 140B may be integrated into one processing device 140.

FIG. 5 is a flowchart illustrating an exemplary process for reconstructing a target PET image of a subject according to some embodiments of the present disclosure. In some embodiments, process 500 may be executed by the imaging system 100. For example, the process 500 may be implemented as a set of instructions (e.g., an application) stored in a storage device (e.g., the storage device 150, the storage device 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 500.

In 501, the processing device 140A (e.g., the obtaining module 410) may obtain PET data of a subject.

As used herein, a subject may be biological or non-biological. For example, the subject may include a patient (or a portion thereof), an animal, a man-made object (e.g., a phantom), etc., as described elsewhere in the present disclosure (e.g., FIG. 1 and the descriptions thereof). The PET data may relate to a plurality of coincidence events detected in a PET scan of the subject. The plurality of coincidence events may include true coincidence events, random events, scattering events, etc. The PET data may include the trajectory and/or information of each of the plurality of coincident events. For example, the PET data may include a list of LORs, transverse and longitudinal positions of the LORs, or the like, or any combination thereof.

In some embodiments, a scanner (e.g., a PET scanner, a PET-CT scanner, a PET-MR scanner) may be directed to perform a PET scan on the subject to acquire the PET data. The processing device 140A may obtain the PET data of the subject from the scanner. As another example, the PET data may be previously acquired and stored in a storage device (e.g., the storage device 150, the storage device 220, and/or the storage 390). The processing device 140A may obtain the PET data of the subject from the storage device via a network (e.g., the network 120).

In 502, the processing device 140A (e.g., the preliminary scatter sinogram generation module 420) may generate a preliminary scatter sinogram relating to the scattering events based on the PET data.

As used herein, a preliminary scatter sinogram refers to a scatter sinogram including information of the scattering events (or a portion thereof), which is simulated from the PET data of the subject. The preliminary scatter sinogram may be used to generate a target scatter sinogram relating to the scattering events. A target scatter sinogram refers to a scatter sinogram that is generated based on the preliminary scatter sinogram and has a higher image quality than the preliminary scatter sinogram.

The image quality of a sinogram (e.g., a scatter sinogram) may be measured by one or more image quality indexes, such as a noise level, a contrast ratio, a sharpness value, a smoothness, or the like, or any combination thereof, of the sinogram. The image qualities of two sinograms may be compared by comparing the one or more image quality indexes. For example, the target scatter sinogram may be regarded as having a higher image quality than the preliminary scatter sinogram if it has a lower noise level than the preliminary scatter sinogram. Additionally or alternatively, the target scatter sinogram may be regarded as having a higher image quality than the preliminary scatter sinogram if it has a higher distribution uniformity than the preliminary scatter sinogram.

In some embodiments, the image quality difference between the preliminary scatter sinogram and the target scatter sinogram may be caused by various factors. Merely by way of example, the preliminary scatter sinogram may correspond to a first count of coincidence events of the plurality of coincidence events. The first count of coincidence events refers to a count of coincidence events that are used to generate the preliminary scatter sinogram, for example, by using a Monte-Carlo simulation algorithm. In some embodiments, the first count may have a low value that is smaller than a threshold, such as 50 million, 100 million, 200 million, 300 million, or the like. For example, the first count may be in a range of 10 million to 100 million. The target scatter sinogram may correspond to a second count of coincidence events of the coincidence events, wherein the second count may be higher than the first count. The second count of coincidence events refers to a predicted or simulated count of coincidence events that need to be used to generate a scatter sinogram of a same (or substantially same) image quality as the target scatter sinogram, for example, by using a Monte-Carlo simulation algorithm. In some embodiments, the second count may have a high value that is greater than a threshold, such as 0.5 billion, 1 billion, 2 billion, 3 billion, or the like. For example, the second count may be in a range of 1 billion to 10 billion. In some embodiments, the first count and/or the second count may be a default setting of the imaging system 100 or set by a user manually. Alternatively, the first count and/or the second count may be determined by the processing device 140A according to an actual need.

Normally, the count of coincidence events used to generate a scatter sinogram may affect the image quality of the scattering sinogram and the calculation resources needed for generating the scatter sinogram. For example, if other conditions remain the same, increasing the count of coincidence events may result in a scatter sinogram having a higher image quality (e.g., a lower noise level). However, the greater the count of coincidence events is, the more computational resources (e.g., a storage space) and/or the longer time may be needed for generating the scatter sinogram. Increasing the count of coincidence events may call for more advanced computing devices, and/or cause a longer scanning and/or image reconstruction time in clinical examinations and/or treatment. The systems and methods disclosed herein may first generate the preliminary scatter sinogram of a relatively low image quality (e.g., a high noise level) using a small portion of the coincidence events, and then generate, based on the preliminary scatter sinogram, the target scatter sinogram with a higher image quality (e.g., a reduced noise level) than the preliminary scatter sinogram, thereby achieving an improved reconstruction efficiency by taking advantage of a reduced computational complexity and/or resources needed for generating the preliminary scatter sinogram.

It should be noted that the difference in the counts of coincidence events is merely an exemplary factor that induces the difference in the image quality between the preliminary scatter sinogram and the scatter sinogram generator. One or more other factors, such as, a computation time may also affect the image quality of the preliminary scatter sinogram. The systems and methods may be applied to reduce or eliminate the effect of one or more other factors to improve the image quality.

In some embodiments, to generate the preliminary scatter sinogram, the processing device 140A may generate a preliminary PET image of the subject based on the PET data. The preliminary PET image may need to undergo an image correction, a noise reduction, or the like, to more accurately indicate positioning information of the radioactive tracer isotope injected into the subject. The preliminary PET image may be generated based on the PET data according to a PET image reconstruction algorithm, such as an ordered subsets expectation maximization (OSEM) algorithm, a maximum likelihood (MLEM) algorithm, and a filter back projection (FBP) algorithm. The processing device 140A may further generate the preliminary scatter sinogram based on the preliminary PET image. For example, the processing device 140A may generate the preliminary scatter sinogram by applying a scatter sinogram estimation technique, such as, a convolution algorithm, a hardware dual-energy windows algorithm, an analytical modeling algorithm, a Monte-Carlo Simulation algorithm, or the like, or any combination thereof. In some embodiments, the processing device 140A may generate the preliminary scatter sinogram by performing the process 600 as in connection with FIG. 6.

In 503, the processing device 140A (e.g., the target scatter sinogram generation module 430) may generate a target scatter sinogram relating to the scattering events by applying a scatter sinogram generator based on the preliminary scatter sinogram.

The scatter sinogram generator refers to a model or an algorithm configured to generate a target scatter sinogram with a desired image quality based on the preliminary scatter sinogram. For example, the scatter sinogram generator may include a machine-learning model (e.g., a trained neural network) for generating a scatter sinogram with a desired image quality based on its input.

In some embodiments, the input of the scatter sinogram generator may include the preliminary scatter sinogram itself or a combination of the preliminary scatter sinogram and a true sinogram relating to the true coincidence events and the scattering events detected in the PET scan of the subject. The preliminary scatter sinogram, which is generated from a portion of the coincidence events, may lose some information relating to the scattering events. The true sinogram may include the original information relating to the scattering events, and serve as an input in combination with the preliminary scatter sinogram so as to improve the accuracy of the target scatter sinogram to be generated, and in turn the PET image reconstruction accuracy. Optionally, the processing device 140A may preprocess the preliminary scatter sinogram and/or the true sinogram to generate the input of the scatter sinogram generator. The preprocessing of the preliminary scatter sinogram and/or the true sinogram may include an image denoising, an image enhancement, an image smoothing, an image transformation, an image resampling, an image normalization, an image concatenation, or the like, or a combination thereof.

Merely by way of example, the processing device 140A may generate a normalized preliminary scatter sinogram and a normalized true sinogram by normalizing the preliminary scatter sinogram and the true sinogram, respectively. In some embodiments, the normalization of a sinogram may be performed such that pixel (or voxel) values of the normalized sinogram (e.g., the normalized preliminary scatter sinogram, the normalized true sinogram) may be within a preset range. In some embodiments, the scatter sinogram generator may be trained using a plurality of sample preliminary scatter sinograms and a plurality of sample true sinograms. The processing device 140A may normalize the preliminary scatter sinogram and the true sinogram according to Equation (1) as below, respectively:

$$I' = \frac{I - \mu}{\sigma}, \quad (1)$$

where I may represent a sinogram (e.g., the preliminary scatter sinogram, the true sinogram), I' may represent a normalized sinogram, μ may represent a mean value of sample sinograms with respect to the sinogram used in the training of the scatter sinogram generator, and a may represent a standard deviation of the sample sinograms with respect to the normalized sinogram. For instance, in the normalization of the preliminary scatter sinogram, I' may represent the normalized preliminary scatter sinogram, μ may represent a mean value of sample preliminary scatter sinograms on the basis of which the normalization is performed, and σ may represent a standard deviation of the sample preliminary scatter sinograms. As another example, in the normalization of the true sinogram, I' may represent the normalized true sinogram, μ may represent a mean value of the sample true sinograms, and a may represent a standard deviation of the sample true sinograms.

The processing device 140A may further generate a concatenated sinogram by concatenating the normalized preliminary scatter sinogram and the normalized true sinogram, wherein the concatenated sinogram may be designated as the input of the scatter sinogram generator. In some embodiments, the normalized preliminary scatter sinogram and the normalized true sinogram may be concatenated along a preset dimension (e.g., a channel dimension). For example, the normalized preliminary scatter sinogram and normalized true sinogram may both be or include 2-dimensional images having a first dimension and a second dimension. The normalized preliminary scatter sinogram and normalized true sinogram may be concatenated along a third dimension to generate the concatenated sinogram (e.g., a 3-dimensional sinogram including the first, second and third dimensions).

The processing device 140A may then generate the target scatter sinogram by processing the concatenated sinogram using the scatter sinogram generator. For example, the concatenated sinogram may be inputted into the scatter sinogram generator, and the scatter sinogram generator may output an initial scatter sinogram. The target scatter sinogram may be generated by performing a linear transformation on the initial scatter sinogram. For example, the initial scatter sinogram may be denormalized according to Equation (2) as below:

$$I_t = I'_t * \sigma_{gt} + \mu_{gt}, \quad (2)$$

where $I_t$ may represent the target scatter sinogram, may represent the initial scatter sinogram, $\sigma_{gt}$ may represent a standard deviation of a plurality of sample target scatter sinograms used in the training of the scatter sinogram generator, and $\mu_{gt}$ may represent a mean value (e.g., a gray mean value) of the sample target scatter sinograms used in the training of the scatter sinogram generator.

It should be noted that the above descriptions of the input and output of the scatter sinogram generator are merely provided for the purposes of illustration, and not intended to limit the scope of the present disclosure. For example, the input of the scatter sinogram generator may merely include the preliminary scatter sinogram or the preprocessed preliminary scatter sinogram. As another example, the image normalization of the preliminary scatter sinogram and/or the true sinogram may be omitted. As yet another example, the scatter sinogram generator may output the target scatter sinogram directly.

Figure 10:
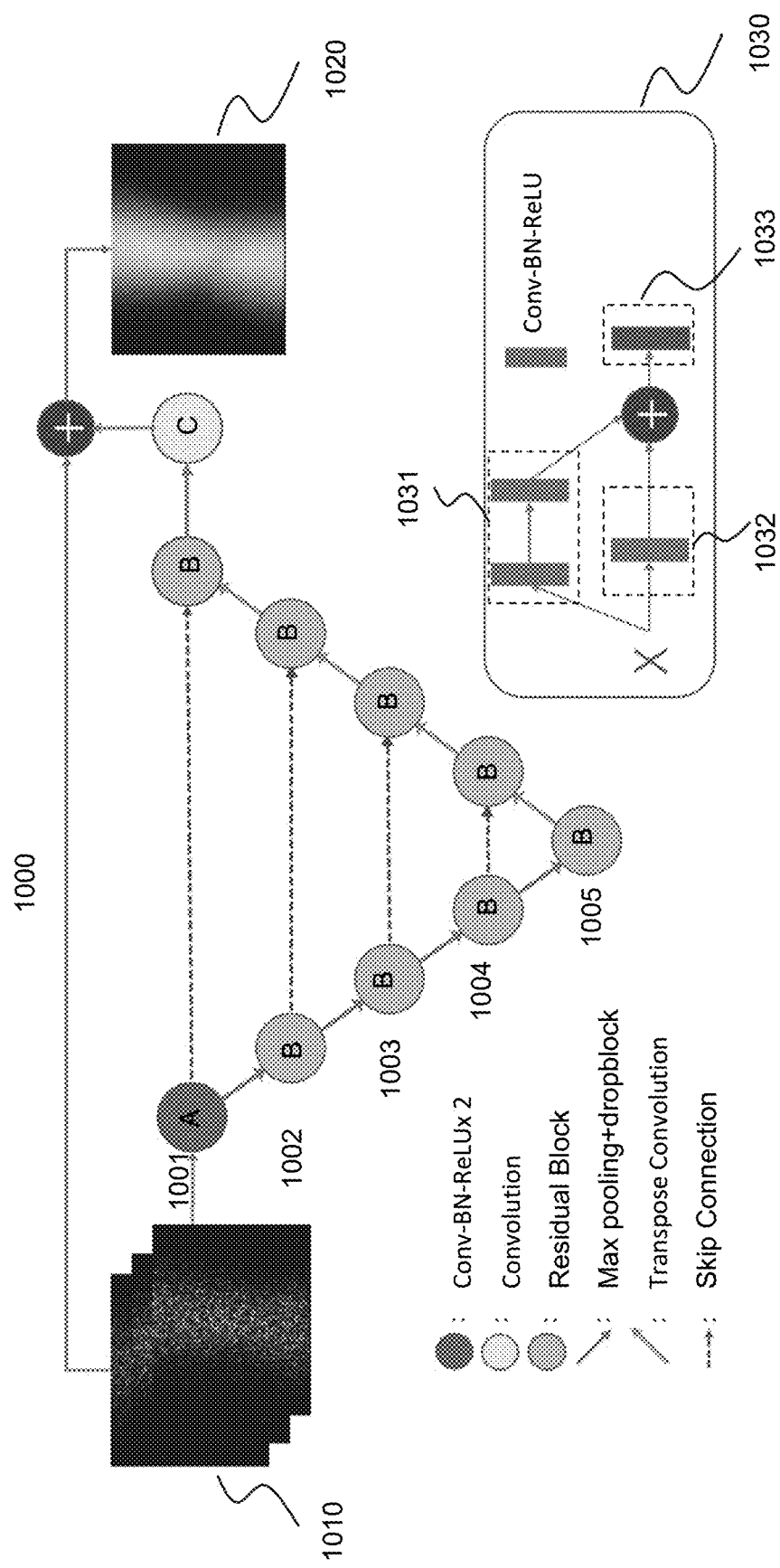
FIG. 10 is a schematic diagram illustrating an exemplary preliminary model according to some embodiments of the present disclosure.

In some embodiments, the scatter sinogram generator may be of any type of machine-learning model. For example, the scatter sinogram generator may include a convolutional neural network (CNN) model (e.g., a fully convolutional model, V-net model, a U-net model, an AlexNet model, an Oxford Visual Geometry Group (VGG) model, a ResNet model), a generative adversarial network (GAN) model (e.g., a pix2pix model, a Wasserstein GAN (WGAN) model), a recurrent network, an ordinary deep neural network, a deep belief network, or the like, or any combination thereof. Optionally, the scatter sinogram generator may include one or more components for feature extraction and/or feature combination, such as a convolutional block, a skip-connection, a residual block, or the like, or any combination thereof. In some embodiments, the scatter sinogram generator may have a same configuration as or a similar configuration to a preliminary model 1000 as shown in FIG. 10.

In some embodiments, the processing device 140A (e.g., the obtaining module 410) may obtain the scatter sinogram generator from one or more components of the imaging system 100 (e.g., the storage device 150, the terminals(s) 130) or an external source via a network (e.g., the network 120). For example, the scatter sinogram generator may be previously trained by a computing device (e.g., the processing device 140B), and stored in a storage device (e.g., the storage device 150, the storage device 220, and/or the storage 390) of the imaging system 100. The processing device 140A may access the storage device and retrieve the scatter sinogram generator. In some embodiments, the scatter sinogram generator may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the scatter sinogram generator may be a supervised learning algorithm. In some embodiments, the scatter sinogram generator may be generated by a computing device (e.g., the processing device 140B) by performing a process (e.g., process 800) for generating a scatter sinogram generator disclosed herein.

In 504, the processing device 140A (e.g., the reconstruction module 440) may reconstruct the target PET image of the subject based on the PET data and the target scatter sinogram.

In some embodiments, the target PET image may have less noise than the preliminary PET image of the subject as described in connection with 502. For example, during the reconstruction of the target PET image, a scatter correction may be performed based on the target scatter sinogram, and the resulting target PET image may have less scattering noises than the preliminary PET image. As another example, during the reconstruction of the target PET image, a random correction may be performed based on a delay sinogram (which will be described in detail in connection with FIG. 6), and the resulting target PET image may have less random noise than the preliminary PET image. The random correction may be performed according to one or more random correction techniques, such as a delayed window technique, a single event technique, a tail fitting technique, or the like, or any combination thereof.

In some embodiments, the processing device 140A may generate the target PET image based on the target scatter sinogram and the PET data according to a PET image reconstruction algorithm (e.g., an OSEM algorithm, an FBP algorithm, an MLAA algorithm). For example, the processing device 140A may generate a scatter correction sinogram by correcting the target scatter sinogram. The processing device 140A may further perform an interpolation on a sampling space of the PET data based on the scatter correction sinogram to generate the target PET image. In some embodiments, the processing device 140A may perform one or more operations in process 700 as described in connection with FIG. 7 to reconstruct the target PET image.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. For example, the process 500 may include an additional operation to transmit the target PET image to a terminal (e.g., a terminal 130) for display.

Figure 6:
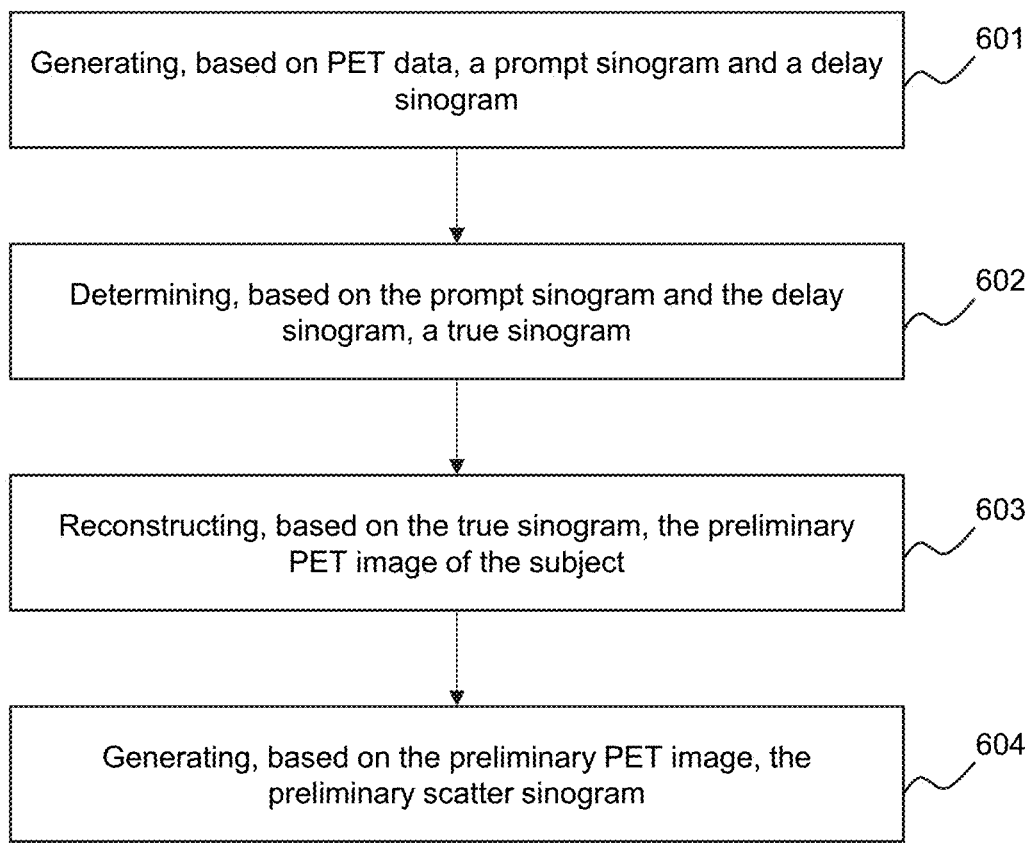
FIG. 6 is a flowchart illustrating an exemplary process for generating a preliminary scatter sinogram according to some embodiments of the present disclosure.

FIG. 6 is a flowchart illustrating an exemplary process for generating a preliminary scatter sinogram according to some embodiments of the present disclosure. In some embodiments, process 600 may be executed by the imaging system 100. For example, the process 600 may be implemented as a set of instructions (e.g., an application) stored in a storage device (e.g., the storage device 150, the storage device 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 600. In some embodiments, one or more operations of the process 600 may be performed to achieve at least part of operation 502 as described in connection with FIG. 5.

In 601, the processing device 140A (e.g., the preliminary scatter sinogram generation module 420) may generate a prompt sinogram and a delay sinogram based on the PET data of the subject.

As described in connection with 501, the PET data may relate to a plurality of coincidence events, including true coincidence events, random events, and scattering events, detected in a PET scan of the subject. In some embodiments, the prompt sinogram may be generated by identifying a pair of photons that impinge on and interact with two scintillators of two detector units within a coincidence time window. In some embodiments, the prompt sinogram may include information relating (mainly) to the coincidence events (e.g., true coincidence events, random events, and scattering events) detected in the PET scan of the subject. The delay sinogram may be generated by identifying a pair of photons that impinge on and interact with two scintillators of two detector units within a delay time window (e.g., a time window that is delayed by a certain period relative to the detection of the first photon of the pair of photons). In some embodiments, the delay sinogram may include information relating (mainly) to random events detected in the PET scan of the subject.

In 602, the processing device 140A (e.g., the preliminary scatter sinogram generation module 420) may determine a true sinogram based on the prompt sinogram and the delay sinogram. For example, the processing device 140A may subtract the delay sinogram from the prompt sinogram to generate the true sinogram. The generated true sinogram may include information relating to the true coincidence events and the scattering events.

In 603, the processing device 140A (e.g., the preliminary scatter sinogram generation module 420) may generate the preliminary PET image of the subject based on the true sinogram.

The preliminary PET image may be generated based on the true sinogram using a PET image reconstruction algorithm as described elsewhere in this disclosure (e.g., operation 502 and the relevant descriptions). In some alternative embodiments, the processing device 140A may generate the preliminary PET image based on the prompt sinogram. The preliminary PET image generated based on the true sinogram may have less random noise than a preliminary PET image generated based on the prompt sinogram because information relating to the random events (e.g., represented in the form of the delay sinogram) is removed in the generation of the true sinogram.

In 604, the processing device 140A (e.g., the preliminary scatter sinogram generation module 420) may generate the preliminary scatter sinogram based on the preliminary PET image.

As described in connection with 501, the preliminary scatter sinogram may be generated based on the preliminary PET image according to one or more of various scatter sinogram estimation techniques. For illustration purposes, the generation of the preliminary scatter sinogram using a Monte-Carlo Simulation algorithm is described hereinafter.

For example, the processing device 140A may obtain an attenuation map of the subject or a portion thereof. The attenuation map may include a plurality of attenuation coefficients of a plurality of physical points of the subject. In some embodiments, the attenuation map may be generated by performing a CT scan on the subject. During the CT scan of the subject, X-rays may be emitted toward the subject or a portion thereof, and different parts of the subject may have different absorptions of the X-rays. A CT image may be generated based on attenuation values of the X-rays after being absorbed by different parts of the subject. The attenuation map may be generated based on the CT image. In some embodiments, the attenuation map may be generated by the processing device 140A based on the CT image or CT scan data acquired in the CT scan. Alternatively, the attenuation map may be previously generated and stored in a storage device (e.g., the storage device 150, the storage device 220, and/or the storage 390). The processing device 140A may obtain the attenuation map of the subject from the storage device via a network (e.g., the network 120).

The processing device 140A may further generate the preliminary scatter sinogram based on the preliminary PET image and the attenuation map by applying the Monte-Carlo Simulation algorithm. For example, the processing device 140A may utilize a Monte-Carlo simulation tool (e.g., a software, an application, a toolkit) to process the preliminary PET image based on the attenuation map. Exemplary Monte-Carlo simulation tools may include an Electron Gamma Shower (EGSnrc), a Monte-Carlo N-Particle Transport (MCNP), a GEometry ANd Tracking (Geant4), a Dose Planning Method (DPM) tool, a Voxel-based Monte Carlo (VMC), a VMC++, or any other simulation tools designed according to the Monte-Carlo simulation algorithm, or any combination thereof. Additionally or alternatively, the preliminary scatter sinogram may be generated by using one or more other scatter correction techniques, for example, an analytical modeling technique, a source modulation algorithm, etc.

In some embodiments, the preliminary scatter sinogram may have a relatively lower image quality than the target scatter sinogram as described in connection with FIG. 5. In order to generate such a preliminary scatter sinogram, a total count of coincidence events that is needed for the Monte-Carlo Simulation, i.e., the first count of coincidence events as described in connection with FIG. 5, may be determined. The Monte-Carlo Simulation may be terminated until the first count of coincidence events is processed in the generation of the preliminary scatter sinogram. The first count may have a low value smaller than a threshold (e.g., 100 million) so that the preliminary scatter sinogram may have a low image quality (e.g., a high noise level).

In some embodiments, the image quality of the preliminary scatter sinogram may be measured by a spatial distribution of the estimated scattering events (or annihilated photons) in the preliminary scatter sinogram. For example, the spatial distribution of the estimated scattering events in the preliminary scatter sinogram may be measured by, for example, a deviation between the counts of the estimated scattering events at different positions in the subject. Merely by way of example, it is assumed that the tracer isotope is (substantially) evenly distributed in the subject, if the deviation is less than a certain percentage (e.g., 5%) of the total count of the estimated scattering events (or annihilated photons), the preliminary scatter sinogram may be considered as having a high image quality (e.g., a low noise level); if the deviation is greater than or equal to the certain percentage of the total count of the estimated scattering events (or annihilated photons), the preliminary scatter sinogram may be considered as having a low image quality (e.g., a high noise level).

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. In some embodiments, the processing device 140A may merely generate or obtain the prompt sinogram in 601. Operation 602 may be omitted, and the processing device 140A may generate the preliminary PET image of the subject based on the prompt sinogram in 603. Optionally, random correction may be performed in the reconstruction of the target PET image to eliminate or reduce the effect of the random events.

Figure 7:
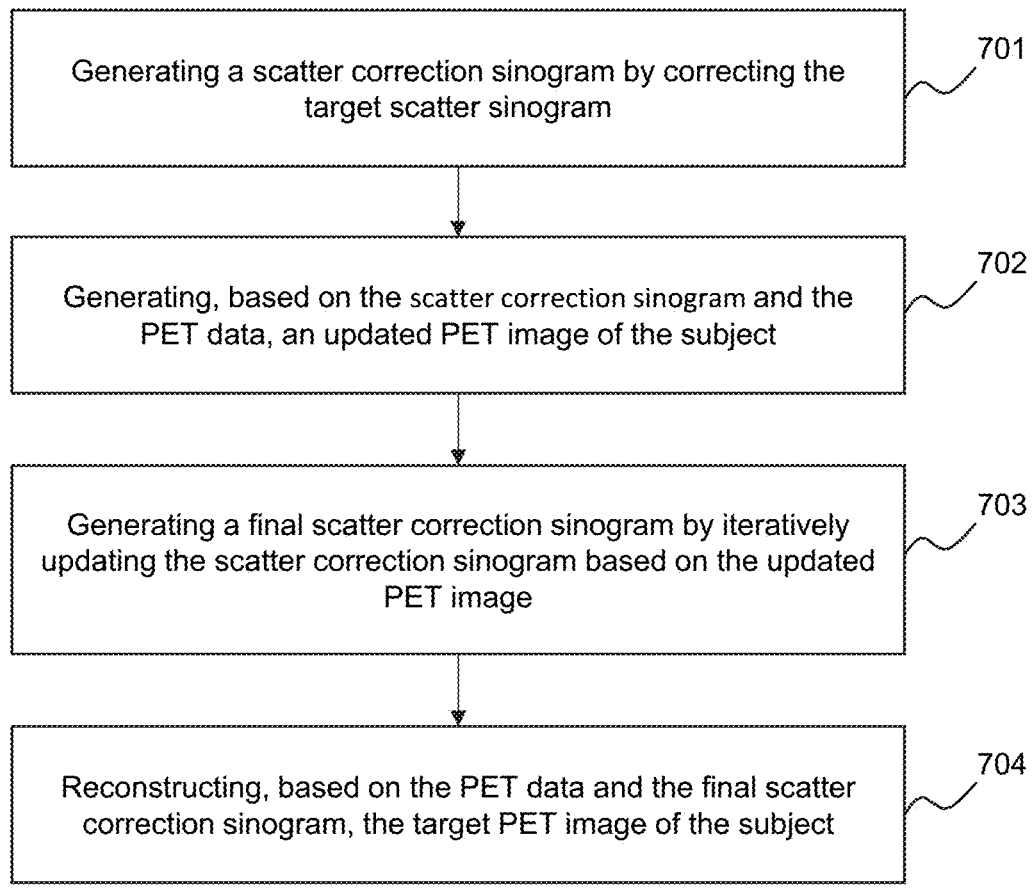
FIG. 7 is a flowchart illustrating an exemplary process for reconstructing a target PET image according to some embodiments of the present disclosure.

FIG. 7 is a flowchart illustrating an exemplary process for reconstructing a target PET image according to some embodiments of the present disclosure. In some embodiments, process 700 may be executed by the imaging system 100. For example, the process 700 may be implemented as a set of instructions (e.g., an application) stored in a storage device (e.g., the storage device 150, the storage device 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 700. In some embodiments, one or more operations of the process 700 may be performed to achieve at least part of operation 504 as described in connection with FIG. 5.

In 701, the processing device 140A (e.g., the reconstruction module 440) may generate a scatter correction sinogram by correcting the target scatter sinogram.

In some embodiments, the correction of the target scatter sinogram may include, for example, a statistical scaling operation, a geometric correction, or the like, or any combination thereof. For example, a statistical scaling operation may be performed on the target scatter sinogram such that the scatter correction sinogram has a same or substantially same computation amount as the true sinogram. A computational cost of a sinogram may be measured by, for example, the amount of coincidence events that the sinogram relates to, the pixel (or voxel) value range in the sinogram, or the like, or a combination thereof. For example, the statistical scaling operation may be performed such that the pixel (or voxel) value range of the scatter correction sinogram is substantially the same as that of the true sinogram.

In some embodiments, the processing device 140A may determine a scaling coefficient and perform the statistical scaling operation by multiplying the target scatter sinogram by the scaling coefficient. For example, the scaling coefficient may be determined by dividing the computational cost of the target scatter sinogram by the computational cost of the true sinogram. Alternatively, the processing device 140A may determine a formula representing a relationship between the target scatter sinogram and the true sinogram according to a least-squares fit algorithm. The formula may include one or more fitting parameters, and the processing device 140A may perform the statistical scaling operation on the target scatter sinogram based on the fitting coefficients or the formula. In some embodiments, the processing device 140A may perform a geometric correction on the target scatter sinogram based on geometric data in the target scatter sinogram and/or geometric data in the PET data.

In 702, the processing device 140A (e.g., the reconstruction module 440) may generate an updated PET image of the subject based on the scatter correction sinogram and the PET data.

In some embodiments, the updated PET image may be generated by performing an initial fast reconstruction on PET data and the scatter correction sinogram according to a PET image reconstruction algorithm as described elsewhere in this disclosure (e.g., the operation 502 and the relevant descriptions). The updated PET image may have a relatively lower image quality (e.g., a lower image resolution) than the target PET image to be generated.

In 703, the processing device 140A (e.g., the reconstruction module 440) may generate a final scatter correction sinogram by iteratively updating the scatter correction sinogram based on the updated PET image.

For example, the updating of the scatter correction sinogram may include one or more iterations. In each current iteration, the processing device 140A may generate a first scatter correction sinogram based on the updated PET image generated in a previous iteration. For example, the processing device 140A may generate an updated preliminary scatter sinogram by performing operation 604 on the updated PET image generated in a previous iteration. The processing device 140A may further generate the first scatter correction sinogram by performing operation 503 on the updated preliminary scatter sinogram.

The processing device 140A may determine whether a termination condition is satisfied in the current iteration. Exemplary termination conditions may include that a certain count of iterations is performed, the iteration operation lasts for more than a certain period, the first scatter correction sinogram has a desired image quality, etc. For example, the termination condition may be that more than a certain count of iterations is performed. The certain count may be a default value of the imaging system 100, or set by a user manually, or determined by the processing device 140A according to an actual need. The certain count may have any positive integer, for example, within a range from 2 to 20, or 3 to 8. For example, the certain count may be 4. In some embodiments, whether the termination condition is satisfied may be determined manually by a user. For example, the first scatter correction sinogram may be displayed on an interface implemented on, for example, the terminal 130, and the user may input an evaluation result regarding whether the first scatter correction sinogram has a desired image quality.

If it is determined that the termination condition is satisfied in the current iteration, the processing device 140A may designate the first scatter correction sinogram as the final scatter correction sinogram of the subject. If it is determined that the termination condition is not satisfied in the current iteration, the processing device 140A may proceed to a next iteration to update the first scatter correction sinogram until the termination condition is satisfied. By iteratively updating the first scatter correction sinogram, a final scatter correction sinogram having an improved accuracy may be generated so as to improve the accuracy of the target PET image to be reconstructed.

In 704, the processing device 140A (e.g., the reconstruction module 440) may reconstruct the target PET image of the subject based on the PET data and the final scatter correction sinogram.

In some embodiments, the target PET image of the subject may be generated by reconstructing the PET data and the final scatter correction sinogram according to a PET image reconstruction algorithm. In some embodiments, the reconstruction of the target PET image may cost more time than the reconstruction of the updated PET image as described in connection with 701. The target PET image may have a higher image quality (e.g., a higher image resolution) than the updated PET image. In some embodiments, the difference in the reconstruction time and/or the image quality between the target PET image and the updated PET image may be caused by the difference in the sample precision (e.g., measured by a computational cost) between the scatter correction sinogram used in the reconstruction of the updated PET image and the final scatter correction sinogram used in the reconstruction of the target PET image. For example, the computational cost of the final scatter correction sinogram may be higher than that of the scatter correction sinogram, so that the reconstruction of the target PET image may cost more time, and the target PET image may have a higher image resolution than the updated PET image.

It should be noted that the above description regarding the process 700 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. In some embodiments, operation 701 may be omitted. In 702, the processing device 140A may generate the updated PET image of the subject based on the original target scatter sinogram and the PET data. In 703, the processing device 140A may generate the final scatter correction sinogram based on the target scatter sinogram and the updated PET image (e.g., by iteratively updating the target scatter sinogram based on the updated PET image).

FIG. 8 is a flowchart illustrating an exemplary process for generating a scatter sinogram generator according to some embodiments of the present disclosure. In some embodiments, process 800 may be executed by the imaging system 100. For example, the process 800 may be implemented as a set of instructions (e.g., an application) stored in a storage device (e.g., the storage device 150, the storage device 220, and/or the storage 390). In some embodiments, the processing device 140B (e.g., the processor 210 of the computing device 200, the CPU 340 of the mobile device 300, and/or one or more modules illustrated in FIG. 4B) may execute the set of instructions and may accordingly be directed to perform the process 800. In some embodiments, the process 800 may be performed by another device or system other than the imaging system 100, e.g., a device or system of a vendor or of a manufacturer. For illustration purposes, the implementation of the process 800 by the processing device 140B is described as an example.

In 801, the processing device 140B (e.g., the obtaining module 450) may obtain a plurality of training samples. Each of the training samples may include a sample preliminary scatter sinogram and a sample target scatter sinogram relating to sample scattering events detected in a sample PET scan of a sample subject, wherein the sample target scatter sinogram may have a higher image quality (e.g., a lower noise level) than the sample preliminary scatter sinogram.

For a training sample, the corresponding sample subject may be of the same type as or a different type from the subject as described in connection with 501. For example, the subject may be the head of a patient, and the sample subject may be the head of another patient or a man-made object (e.g., a phantom). In some embodiments, sample PET data of the sample subject may be collected in a sample PET scan of the sample subject. The sample PET data may relate to a plurality of sample coincidence events detected in the sample PET scan. The sample preliminary scatter sinogram and the sample target scatter sinogram may be simulated from the sample PET data with different simulation conditions. The different simulation conditions may include, for example, different computation amounts (e.g., different counts of coincidence events used in simulation), different computation times, different spatial distributions of coincidence event used in the simulation, or any other conditions that may induce a difference between the image qualities of the sample preliminary scatter sinogram and the sample target scatter sinogram.

Merely by way of example, the sample preliminary scatter sinogram may be simulated based on a third count of sample coincidence events of the sample plurality of coincidence events according to a scatter sinogram estimation technique (e.g., a Monte-Carlo simulation algorithm). The sample target scatter sinogram may be simulated based on a fourth count of sample coincidence events of the plurality of sample coincidence events according to a scatter sinogram estimation technique (e.g., a Monte-Carlo simulation algorithm), wherein the fourth count may be higher than the third count. In some embodiments, the third count and the fourth count may be equal to or substantially equal to the first count and the second count, respectively, as described in connection with FIG. 5.

In some embodiments, each of the plurality of training samples may further include a sample true sinogram relating to sample true coincidence events and sample scattering events detected in the corresponding sample PET scan. The sample true sinogram of a training sample may be generated in a similar manner as the generation of the true sinogram as described in connection with operations 601 and 602. For example, for a training sample, the processing device 140B may generate a sample prompt sinogram and a sample delay sinogram based on the sample PET data of the training sample. The processing device 140B may further determine the sample true sinogram based on the sample prompt sinogram and the sample delay sinogram. For illustration purposes, the following description is described with reference to training samples each of which includes a sample preliminary scatter sinogram, a sample target scatter sinogram, and a sample true sinogram. This is not intended to limit the scope of the present disclosure, and each training sample may not include a true sinogram according to some alternative embodiments of the present disclosure.

In some embodiments, the processing device 140B may preprocess at least one of the training samples. For example, for a training sample, the processing device 140B may normalize one or more of the sample preliminary scatter sinogram, the sample target scatter sinogram, and the sample true sinogram of the training sample. The normalization of a sinogram may be performed in a similar manner as that of the preliminary scatter sinogram and the true sinogram as described in connection with 503, for example, according to Equation (1). The processing device 140B may further generate a cropped sample preliminary scatter sinogram, a cropped sample target scatter sinogram, a cropped sample true sinogram by cropping the normalized sample preliminary scatter sinogram, the normalized sample target scatter sinogram, and the normalized sample true sinogram of the training sample, respectively. In some embodiments, the cropped sample preliminary scatter sinogram may include one or more first image crops cropped from the sample preliminary scatter sinogram. In some embodiments, the cropped sample target scatter sinogram may include one or more second image segments cropped from the sample target scatter sinogram. In some embodiments, the cropped sample true sinogram may include one or more third image segments cropped from the sample true sinogram. The position(s) of the first image segments in the sample preliminary scatter sinogram may be the same as the position(s) of the second image segment(s) in the sample target scatter sinogram and the position(s) of the third image segment(s) in the sample true sinogram. In some embodiments, the position of a first image segment in a first sinogram being the same as the position of a second image segment in a second sinogram indicates that the first image segment and the second image segment correspond to a same position in the sinogram domain. Additionally or alternatively, each of the first, second, and third image segments may have a same size, for example, [64, 64, 5] or [64, 64, 1].

The processing device 140B may further generate a sample concatenated sinogram by concatenating the cropped sample preliminary scatter sinogram and the cropped sample true sinogram. In some embodiments, the cropped sample preliminary scatter sinogram and the cropped sample true sinogram may be concatenated along a preset dimension (e.g., a channel dimension). For example, a certain count (e.g., N) of 2D slices of the cropped sample preliminary scatter sinogram may be concatenated with the same count (e.g., N) of 2D slices of the cropped sample true sinogram along the channel dimension. N may be equal to any positive integer, such as, 1, 3, 5, 10, 15, or the like. In some embodiments, N may be a positive odd number. Merely by way of example, 5 2D slices of the cropped sample preliminary scatter sinogram and 5 2D slices of the cropped sample true sinogram, each of which has a size of [64, 64], may be concatenated along the channel dimension to generate a sample concatenated sinogram having a size of [64, 64, 10]. In such cases, the preprocessed training sample may include the sample concatenated sinogram having a size of [64, 64, 10] and the cropped sample true sinogram having a size of, for example, [64, 64, 1]. In some embodiments, the concatenation of the 2D slices of the cropped sample preliminary scatter sinogram and the cropped sample true sinogram along a channel dimension may also be referred to as a 2.5D concatenation.

In some embodiments, a (preprocessed) training sample (or a portion thereof) may be previously generated and stored in a storage device (e.g., the storage device 150, the storage device 220, and/or the storage 390). The processing device 140B may obtain the (preprocessed) training sample (or a portion thereof) from the storage device via a network (e.g., the network 120). Additionally or alternatively, a (preprocessed) training sample (or a portion thereof) may be generated by the processing device 140B based on the sample PET data of the training sample. In some embodiments, the count of the (preprocessed) training samples may be equal to any positive integer. For example, M (a positive integer) training samples, each of which includes one sample preliminary scatter sinogram, one sample target scatter sinogram, and one sample true sinogram, may be obtained for model training.

In 802, the processing device 140B (e.g., the model generation module 460) may generate the scatter sinogram generator by training a preliminary model using the plurality of (preprocessed) training samples.

The preliminary model may be of any type of machine learning model (e.g., a deep learning model), for example, a fully convolutional network (FCN) (e.g., a V-net model, a U-net model), a generative adversarial network (GAN) (e.g., a pix2pix model, a Wasserstein GAN (WGAN) model), a recurrent network, an ordinary deep neural network, and a deep belief network, or the like, or any combination thereof. In some embodiments, the preliminary model may have a same configuration as or a similar configuration to a neural network 1000 as shown in FIG. 10.

In some embodiments, the preliminary model may include one or more model parameters. For example, the preliminary model may be a U-net model and exemplary model parameters of the preliminary model may include the number (or count) of layers, the number (or count) of kernels, a kernel size, a pooling size, a stride, a loss function, or the like, or any combination thereof. Before training, the model parameter(s) may have their respective initial values. For example, the processing device 140B may initialize parameter value(s) of the model parameter(s) of the preliminary model.

In some embodiments, the training of the preliminary model may be performed based on one or more gradient descent algorithms. Exemplary gradient descent algorithms may include an Adam optimization algorithm, a stochastic gradient descent (SGD)+ Momentum optimization algorithm, a Nesterov accelerated gradient (NAG) algorithm, an Adaptive Gradient (Adagrad) algorithm, an Adaptive Delta (Adadelta) algorithm, a Root Mean Square Propagation (RMSprop) algorithm, an AdaMax algorithm, a Nadam (Nesterov-accelerated Adaptive Moment Estimation) algorithm, an AMSGrad (Adam+SGD) algorithm, or the like, or any combination thereof.

In some embodiments, the training of the preliminary model may include one or more training stages. Merely by way of example, the training of the preliminary model may include two training stages in which different gradient descent algorithms are adopted. In the first training stage, the processing device 140B may generate a preliminary scatter sinogram generator by training the preliminary model using the plurality of training samples according to a first gradient descent algorithm, such as an Adam optimization algorithm. In the second training stage, the processing device 140B may generate the scatter sinogram generator by training the preliminary scatter sinogram generator using the training samples according to a second gradient descent algorithm. The second gradient descent algorithm may be different from the first gradient descent algorithm. For example, the second gradient descent algorithm may be a stochastic gradient descent (SGD)+ Momentum optimization algorithm. As used herein, the "using the training samples" refers to using at least a portion of the training samples (or preprocessed training samples). In some embodiments, a same set of training samples or different sets of training samples may be used in the two training stages. For example, the two training stages may utilize two different sub-sets of the training samples. By using the first and second gradient descent algorithms to train the preliminary model with two training stages, the preliminary model may converge more quickly and/or the generated scatter sinogram generator may have an improved accuracy and/or reliability.

Additionally or alternatively, different learning rate strategies may be adopted for the two training stages in training the preliminary model. Exemplary learning rate strategies may include a learning rate range test (LR Range Test) technique, a cycle learning rate technique, a fixed learning rate technique, a learning rate decay technique, a bisection line search technique, a backing line search technique, a cosine annealing technique, an SGD with warm restarts (SGDR), a differential learning rate technique, or the like, or any combination thereof.

Merely by way of example, before the first training stage, the processing device 140B may determine an optimal learning rate with respect to the first gradient descent algorithm according to an LR Range Test technique. For example, the processing device 140B may determine an initial learning rate, which has a relatively small value. The processing device 140B may update the preliminary model based on the training samples by performing a plurality of first iterations, during which the learning rate may start with the initial learning rate and increase after each first iteration. The processing device 140B may further determine a value of a loss function of the preliminary model in each of the first iterations, and generate an LR Range Test diagram based on the value of the loss function in each first iteration. The LR Range Test diagram may be represented in a two-dimensional (2D) coordinate system, wherein a horizontal axis represents the learning rate and a longitudinal axis represents the loss function. Generally, the LR Range Test diagram may be divided into three sub-ranges, including a first sub-range in which the loss function has a substantially constant value due to the low learning rate in the first sub-range, a second sub-range in which the loss function converges rapidly, and a third sub-range in which the loss function diverges due to the high learning rate in the third sub-range. The processing device 140B may then identify a point that corresponds to the minimum value of the loss function in the LR Range Test diagram, and designate the learning rate of the identified point as the optimal learning rate. In some embodiments, the optimal learning rate may be set by a user manually or determined by the processing device 140B according to an actual need.

In the first training stage, the processing device 140B may generate the preliminary scatter sinogram generator by training the preliminary model using the plurality of training samples according to the first gradient descent algorithm and the optimal learning rate. For example, the processing device 140B may generate the preliminary scatter sinogram generator by performing one or more second iterations to iteratively update the model parameter(s) of the preliminary model. The optimal learning rate may be used as a constant learning rate or an initial learning rate that may be adaptively adjusted in the training of the preliminary model.

Before the second training stage, the processing device 140B may determine a learning rate range with respect to the second gradient descent algorithm based on the optimal learning rate (or the LR Range Test diagram). The lowest learning rate of the learning rate range may be smaller than the optimal learning rate, and the highest learning rate of the learning rate range may be greater than the optimal learning rate. The processing device 140B may generate the scatter sinogram generator by training the preliminary scatter sinogram generator using the plurality of training samples according to the second gradient descent algorithm, the learning rate range, and a cycle learning rate technique. For example, the processing device 140B may update the preliminary scatter sinogram generator based on the training samples by performing one or more third iterations. During the third iterations, the value of the learning rate may cycle one or more times. In each cycle, the learning rate may increase from the lowest learning rate to the highest learning rate, and then decrease from the highest learning rate back to the lowest learning rate. The count of the cycle(s) may be any positive integer, which may be set manually by a user or determined by the processing device 140B according to, for example, the count of third iterations. Using the cycle learning rate technique, the parameters of the preliminary scatter sinogram generator may be optimized in a wider value range, thereby making the trained scatter sinogram generator have an improved generalization ability.

In some embodiments, as aforementioned, the training of the preliminary model may include one or more second iterations, and training of the preliminary scatter sinogram generator may include one or more third iterations. A second iteration and a third iteration may be performed in a similar manner. For illustration purposes, an exemplary current iteration of the second iteration(s) in the first training stage is described in the following description. The current iteration may be performed based on at least a portion of the training samples. In some embodiments, a same set or different sets of training samples may be used in different iterations in training the preliminary model. In the current iteration, for each of at least a portion of the training samples, the processing device 140B may generate a predicted target scatter sinogram of the corresponding sample subject by inputting the sample preliminary scatter sinogram and the sample true sinogram (e.g., in the form of a sample concatenated sinogram) into an updated preliminary model determined in a previous second iteration, and the updated preliminary model may output a predicted target scatter sinogram. The processing device 140B may then determine a value of a loss function based on the predicted target scatter sinogram and the sample target scatter sinogram (or the cropped sample target scatter sinogram) of each of the at least a portion of the training samples. The loss function may be used to evaluate the accuracy and reliability of the updated preliminary model, for example, the smaller the loss function is, the more reliable the updated preliminary model is. Exemplary loss functions may include an L1 loss function, a focal loss function, a log loss function, a cross-entropy loss function, a Dice loss function, etc. The processing device 1406 may further update the value(s) of the model parameter(s) of the updated preliminary model to be used in a next iteration based on the value of the loss function according to, for example, a backpropagation algorithm.

In some embodiments, the one or more second iterations may be terminated if a termination condition is satisfied in the current iteration. An exemplary termination condition may be that the value of the loss function obtained in the current iteration is less than a predetermined threshold. Other exemplary termination conditions may include that a certain count of second iterations is performed, that the loss function converges such that the differences of the values of the loss function obtained in consecutive second iterations are within a threshold, etc. If the termination condition is satisfied in the current iteration, the processing device 1406 may designate the updated preliminary model as the preliminary scatter sinogram generator.

It should be noted that the above description regarding the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. For example, after the scatter sinogram generator is generated, the processing device 1406 may further test the scatter sinogram generator using a set of testing samples. Additionally or alternatively, the processing device 1406 may update the scatter sinogram generator periodically or irregularly based on one or more newly-generated training samples (e.g., new sample scatter sinogram generated in medical diagnosis).

In some embodiments, the preliminary model may be trained with a single training stage or more than two training stages. If multiple training stages are implemented, a same gradient descent algorithm or different gradient descent algorithms may be utilized in different training stages. Additionally or alternatively, a same learning rate schedule or different learning rate schedules may be utilized in different training stages.

Figure 9:
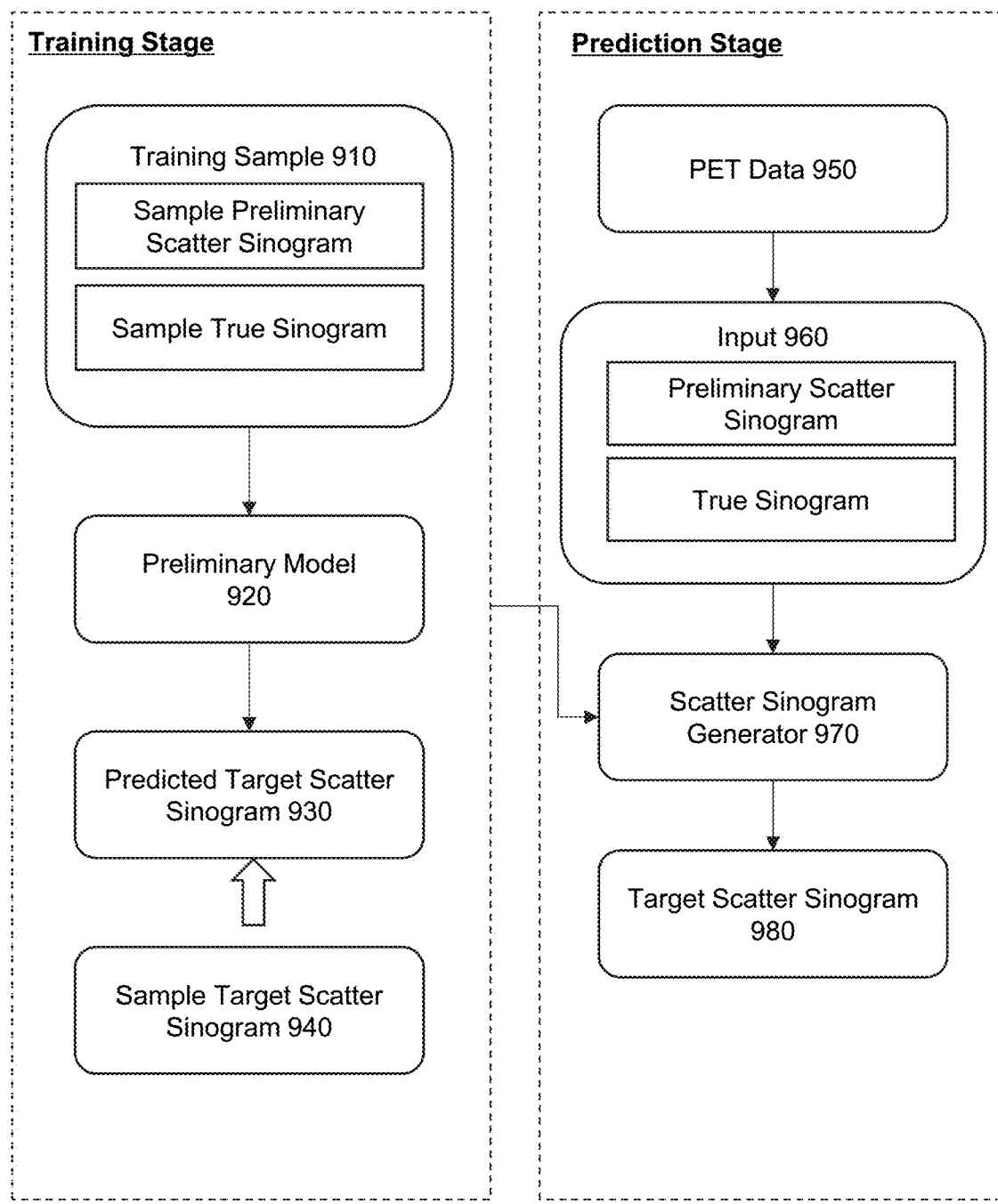
FIG. 9 is a schematic diagram illustrating an exemplary training stage and prediction stage of a scatter sinogram generator according to some embodiments of the present disclosure.

FIG. 9 is a schematic diagram illustrating an exemplary training stage and prediction stage of a scatter sinogram generator 970 according to some embodiments of the present disclosure.

In the training stage, a plurality of training samples, each of which includes a sample preliminary scatter sinogram, a sample true sinogram, and a sample target scatter sinogram, may be used to train a preliminary model 920. As shown in FIG. 9, an input 910 may be inputted into the preliminary model 920, and the preliminary model 920 may output a predicted target scatter sinogram 930 in response to the input 910. The input 910 may be generated based on a sample preliminary scatter sinogram and a sample true sinogram of each training sample. For example, a sample concatenated sinogram may be generated based on the sample preliminary scatter sinogram and the sample true sinogram of each training sample as the input 910. For each training sample, the predicted target scatter sinogram 930 may be compared with the sample target scatter sinogram 940 of the training sample to determine a value of a loss function. The preliminary model 920 may then be updated to generate the scatter sinogram generator 970 based on the value of the loss function.

In the prediction stage, PET data 950 of a subject may be acquired in a PET scan of the subject. An input 960 including a preliminary scatter sinogram and a true sinogram may be generated based on the PET data 950. The scatter sinogram generator 970 may be used to receive an input 960 and output a target scatter sinogram 980. The target scatter sinogram 980 may have a higher image quality (e.g., a lower noise level) than the preliminary scatter sinogram and be used for reconstructing a target PET image of the subject.

FIG. 10 is a schematic diagram illustrating an exemplary preliminary model 1000 according to some embodiments of the present disclosure. In some embodiments, the preliminary model 1000 may be trained to generate a scatter sinogram generator as described elsewhere in this disclosure (e.g., FIG. 5 and the relevant descriptions).

As shown in FIG. 10, the preliminary model 1000 may be configured to generate an output 1020 by receiving and processing an input 1010. For example, the input 1010 may include a training sample as in connection with FIG. 8. The training sample may include a sample preliminary scatter sinogram and a sample target scatter sinogram relating to scattering events detected in a sample PET scan of a sample subject. The output 1020 may include a predicted target scatter sinogram of the training sample.

The preliminary model 1000 may include an input layer, an output layer, and a plurality of sequentially connected layers 1001, 1002, 1003, 1004, and 1005. The layer 1001 may include two convolution units (represented by a circle marked with A) and a residual block (represented by a circle marked with B). Each of the two convolution units (or referred to as Conv-BN-ReLU units) may include a convolution block, a batch normalization block, and a rectified linear unit function block. In a convolution unit, the convolution block may be configured to extract feature information (e.g., a feature map or a feature vector) from an input, the batch normalization (BN) block may be configured to normalize an output of the convolution block, and the rectified linear unit (ReLU) function block may be configured to perform a nonlinear transformation on an input received from the batch normalization block.

Each of the layers 1002, 1003, and 1004 may include a first residual block and a second residual block. In some embodiments, each of the first and second residual blocks may have a same configuration as or a similar configuration to a residual block 1030 as shown in FIG. 10. The residual block 1030 may include a first layer 1031 and a second layer 1032. The first layer 1031 may include two Conv-BN-ReLU units, and the second layer 1032 may include one Conv-BN-ReLU unit. Each of the first layer 1031 and the second layer 1032 may process an input (e.g., an output of a previous layer) and generate an output (e.g., a feature map or a feature vector). The outputs of the first layer 1031 and the second layer 1032 may be added together to generate an output 1033 of the residual block 1030. Compared with a conventional U-net model that mainly uses convolution blocks for feature extraction, the U-shaped preliminary model 1000 disclosed herein may achieve an improved accuracy and training efficiency by using the residual blocks. For example, in training the preliminary model 1000, the residual blocks may better preserve information or features, avoid the problem of vanishing gradient, and facilitate model convergence. In some embodiments, each of the layers 1002, 1003, and 1004 may be referred to as a residual layer.

As shown in FIG. 10, the convolution units of the layer 1001 and the first residual blocks of the layers 1002, 1003 and 1004 may be connected to a next layer via a downsampling path along which information (e.g., an output of a specific block) may be downsampled. For example, the downsampling path may include a max-pooling layer and a dropblock layer. The max-pooling layer may be configured to perform a max-pooling operation on an output (e.g., a feature map or a feature vector) of the previous layer, so as to downsample the output of the previous layer. The dropblock layer may be a regularization algorithm that drops contiguous regions from a feature map, which may prevent the preliminary model 1000 from overfitting and make the generated scatter sinogram generator have an improved reliability and/or an improved generalization ability.

The residual block of the layer 1005 and the second residual block of each of the layers 1002 to 1004 may be connected to the previous layer via an upsampling path along which information (e.g., an output of a specific block) may be upsampled. For example, the upsampling path may include a transpose convolution layer configured to upsample an output of a previous layer. Using the downsampling path and the upsampling path, the preliminary model 1000 may perform feature extraction at different scales (or image resolutions) and have a higher model accuracy.

In some embodiments, the preliminary model 1000 may further include a plurality of skip connections (represented by dotted arrow lines in FIG. 10). A skip connection may connect two blocks of a same layer or different layers and be configured to combine information of the connected blocks. For example, a skip connection may establish a connection between the first and second residual blocks of the layer 1002. The skip connection may be used to transmit an output of the first residual block to the second residual block, such that original feature information extracted by the first residual block may be preserved to facilitate image information recovery and improve the accuracy of the resulting scatter sinogram generator.

Additionally or alternatively, the residual block of the layer 1001 may be connected to a convolution block represented by a circle marked with C. The preliminary model 1000 may further include a long residual connection that directly connects the input layer and the convolution block C. For example, using the long residual connection, the preliminary model 1000 may learn a difference between the sample preliminary scatter sinogram of a training sample and a predicted target scatter sinogram outputted by the residual block of the layer 1001, thereby facilitating or expediting the convergence of the preliminary model 1000.

In some embodiments, the preliminary model 1000 may be a narrow deep learning model, that is, the count of feature maps extracted from the input 1010 by the preliminary model 1000 may be smaller than a threshold. In addition, 1×1 convolution filters may be used in the preliminary model 1000. In this way, the resulting scatter sinogram generator may have a higher reconstruction efficiency in application (e.g., be capable of generating a target scatter sinogram quickly in a period shorter than a threshold period).

It should be noted that the example in FIG. 10 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the preliminary model 1000 may include any number of layers. Each layer may include any count and/or type of blocks. As another example, the preliminary model 1000 may include one or more additional components and/or one or more components (e.g., one or more of the skip connections and/or the long residual connection) illustrated in FIG. 10 may be omitted. As yet another example, the preliminary model 1000 may include any count of residual blocks.

EXAMPLES

The following examples are provided for illustration purposes and not intended to be limiting.

FIG. 11 is a schematic diagram illustrating exemplary sinograms of a first subject generated using different techniques based on PET data of the first subject according to some embodiments of the present disclosure. As shown in FIG. 11, an image 1100A is a preliminary scatter sinogram of the first subject, which was generated based on a first count of coincidence events of the PET data using a Monte-Carlo simulation algorithm. An image 1100B is a true sinogram of the first subject. An image 1100C is a target scatter sinogram of the first subject, which was generated by applying a scatter sinogram generator as described in connection with operation 503. An image 1100D is a scatter sinogram of the first subject, which was generated based on a second count of coincidence events of PET data using the Monte-Carlo simulation algorithm. The second count is higher than the first count.

As shown in FIG. 11, the image 1100C is smoother and includes more scattering event information than the image 1100A, which suggests that the image 1100C has a higher image quality (e.g., a lower noise level) than the image 1100A and may be more suitable for reconstructing a target PET image of the first subject. In addition, the image quality of the image 1100C is close to that of the image 1100D. Compared to the image 1100C, the generation of the image 1100D simulated from a greater count of coincidence events costs more time. For example, the time needed for generating the image 1100D was in the order of 100 times that needed for generating the image 1100A.

FIG. 12 is a schematic diagram illustrating exemplary sinograms of a second subject generated using different techniques based on PET data of the second subject according to some embodiments of the present disclosure. As shown in FIG. 12, an image 1200A is a preliminary scatter sinogram of the second subject, which was generated based on a first count of coincidence events of the PET data using a Monte-Carlo simulation algorithm. An image 1200B is a true sinogram of the second subject. An image 1200C is a target scatter sinogram of the second subject, which was generated by applying a scatter sinogram generator as described in connection with operation 503. An image 1200D is a scatter sinogram of the second subject, which was generated based on a second count of coincidence events of the PET data using the Monte-Carlo simulation algorithm. The second count is higher than the first count.

As shown in FIG. 12, the image 1200C is smoother and includes more scattering event information than the image 1200A, which suggests that the image 1200C has a higher image quality (e.g., a lower noise level) than the image 1200A and may be more suitable for reconstructing a target PET image of the second subject. In addition, the image quality of the image 1200C is close to that of the image 1200D. Compared to the image 1200C, the generation of the image 1200D simulated from a greater count of coincidence events costs more time.

Accordingly, the systems and methods disclosed herein may be used to generate a target scatter sinogram with an improved image quality (e.g., a reduced noise level) using less time and fewer computation recourses, which in turn, may facilitate the reconstruction of a target PET image of the subject having a desired image quality (e.g., with less scatter noises).

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification is provided for illustration purposes and modified according to different situations. For example, a classification condition that "a probability value is greater than the threshold value" may further include or exclude a condition that "the probability value is equal to the threshold value".

What is claimed is:

1. A system for positron emission tomography (PET) image reconstruction, comprising:
   at least one storage device including a set of instructions; and
   at least one processor configured to communicate with the at least one storage device, wherein when executing the set of instructions, the at least one processor is configured to direct the system to perform operations including:
      obtaining PET data of a subject, the PET data being associated with a plurality of coincidence events, the plurality of coincidence events including scattering events and true coincident events;
      generating, based on the PET data, a preliminary scatter sinogram relating to the scattering events and a true sinogram relating to the true coincident events and the scatter events;
      generating, based on the preliminary scatter sinogram and the true sinogram, an input of a scatter sinogram generator, the scatter sinogram generator being a trained machine learning model;
      determining a target scatter sinogram relating to the scattering events by inputting the input into the scatter sinogram generator, the target scatter sinogram having a higher image quality than the preliminary scatter sinogram; and
      reconstructing, based on the PET data and the target scatter sinogram, a target PET image of the subject.

2. The system of claim 1, wherein the generating a preliminary scatter sinogram relating to the scattering events and a true sinogram relating to the true coincident events and the scattering events comprises:
   generating, based on the PET data, the true sinogram relating to the true coincident events and the scattering events;
   generating, based on the true sinogram, a preliminary PET image of the subject; and
   generating, based on the preliminary PET image, the preliminary scatter sinogram, wherein the target PET image includes less scattering noises than the preliminary PET image.

3. The system of claim 2, wherein the generating the preliminary scatter sinogram based on the preliminary PET image comprises:
   obtaining an attenuation map of the subject; and
   generating, based on the attenuation map and the preliminary PET image, the preliminary scatter sinogram.

4. The system of claim 3, wherein the preliminary scatter sinogram is generated based on the attenuation map and the preliminary PET image according to a Monte-Carlo simulation algorithm.

5. The system of claim 2, wherein the generating the true sinogram relating to the true coincident events and the scattering events based on the PET data comprises:
generating, based on PET data, a prompt sinogram relating to the plurality of coincidence events and a delay sinogram relating to random events in the plurality of coincidence events;
determining the true sinogram by subtracting the delay sinogram from the prompt sinogram.

6. The system of claim 1, wherein the input of the scatter sinogram generator includes the preliminary scatter sinogram and the true sinogram.

7. The system of claim 1, wherein the generating an input of a scatter sinogram generator comprises:
normalizing the preliminary scatter sinogram and the true sinogram such that pixel values of the normalized preliminary scatter sinogram and the normalized true sinogram are within a preset range;
generating a concatenated sinogram by concatenating the normalized preliminary scatter sinogram and the normalized true sinogram; and
designating the concatenated sinogram as the input of using the scatter sinogram generator.

8. The system of claim 1, wherein the reconstructing a target PET image of the subject based on the PET data and the target scatter sinogram comprises:
generating a scatter correction sinogram by correcting the target scatter sinogram;
generating an updated PET image of the subject by performing an initial fast reconstruction on PET data and the scatter correction sinogram according to a PET image reconstruction algorithm;
generating a final scatter correction sinogram by iteratively updating the scatter correction sinogram based on the updated PET image; and
reconstructing, based on the PET data and the final scatter correction sinogram, the target PET image of the subject according to the PET image reconstruction algorithm, the target PET image having a higher image quality than the updated PET image.

9. The system of claim 8, wherein the correcting the target scatter sinogram includes:
performing a statistical scaling operation and/or a geometric correction on the target scatter sinogram.

10. The system of claim 1, wherein the scatter sinogram generator comprises a plurality of sequentially connected layers, and the plurality of sequentially connected layers comprises:
a plurality of residual layers, at least one of the plurality of residual layers including a first residual block and a second residual block, the first residual block being connected to a next layer via a downsampling path, and the second residual block being connected to a previous layer via an upsampling path.

11. The system of claim 1, wherein the scatter sinogram generator is trained according to a model training process including:
obtaining a plurality of training samples each of which includes a sample preliminary scatter sinogram and a sample target scatter sinogram relating to sample scattering events detected in a sample PET scan of a sample subject, and a sample true sinogram relating to sample true coincidence events and the sample scattering events detected in the sample PET scan, the sample target scatter sinogram having a higher image quality than the sample preliminary scatter sinogram; and
generating the scatter sinogram generator by training a preliminary model using the plurality of training samples.

12. The system of claim 1, wherein the image quality of a certain scatter sinogram relates to at least one of a noise level, a contrast ratio, or a smoothness of the certain scatter sinogram, the certain scatter sinogram being the target scatter sinogram or the preliminary scatter sinogram.

13. The system of claim 1, wherein:
the preliminary scatter sinogram corresponds to a first count of coincidence events of the plurality of coincidence events, and
the target scatter sinogram corresponding to a second count of coincidence events of the plurality of coincidence events, the second count being higher than the first count.

14. A system, comprising:
at least one storage device storing a set of instructions for generating a scatter sinogram generator; and
at least one processor configured to communicate with the at least one storage device, wherein when executing the set of instructions, the at least one processor is configured to direct the system to perform operations including:
obtaining a plurality of training samples each of which includes a sample preliminary scatter sinogram and a sample target scatter sinogram relating to sample scattering events detected in a sample PET scan of a sample subject, the sample target scatter sinogram having a higher quality than the sample preliminary scatter sinogram, the sample preliminary scatter sinogram corresponding to a first count of sample coincidence events of the sample PET scan, the sample target scatter sinogram corresponding to a second count of sample coincidence events of the sample PET scan, and the second count being higher than the first count, wherein each of the plurality of training samples further comprises a sample true sinogram relating to sample true coincidence events and the sample scattering events detected in the corresponding sample PET scan; and
generating the scatter sinogram generator by training a preliminary model using the plurality of training samples, comprising:
for each of the plurality of training samples,
normalizing the sample preliminary scatter sinogram, the sample target scatter sinogram, and the sample true sinogram of the training sample;
generating a cropped sample preliminary scatter sinogram, a cropped sample target scatter sinogram, a cropped sample true sinogram by cropping the normalized sample preliminary scatter sinogram, the normalized sample target scatter sinogram, and the normalized sample true sinogram of the training sample, respectively; and
generating a sample concatenated sinogram by concatenating the cropped sample preliminary scatter sinogram and the cropped sample true sinogram; and
generating the scatter sinogram generator by training the preliminary model using the sample concatenated sinogram and the cropped sample target scatter sinogram of each of the plurality of training samples.

15. The system of claim 14, wherein the generating the scatter sinogram generator by training a preliminary model using the plurality of training samples comprises:

generating a preliminary scatter sinogram generator by training the preliminary model using the plurality of training samples according to a first gradient descent algorithm; and generating the scatter sinogram generator by training the preliminary scatter sinogram generator using the plurality of training samples according to a second gradient descent algorithm, wherein the second gradient descent algorithm is different from the first gradient descent algorithm.

16. The system of claim 15, wherein the generating the scatter sinogram generator by training a preliminary model using the plurality of training samples further comprises:

determining a first learning rate with respect to the first gradient descent algorithm according to a learning rate range test technique; and determining a second learning rate with respect to the second gradient descent algorithm according to a cycle learning rate technique, wherein the generating a preliminary scatter sinogram generator by training the preliminary model using the plurality of training samples according to a first gradient descent algorithm comprises generating the preliminary scatter sinogram generator by training the preliminary model using the plurality of training samples according to the first gradient descent algorithm and the first learning rate; and the generating the scatter sinogram generator by training the preliminary scatter sinogram generator using the plurality of training samples according to a second gradient descent algorithm comprises generating the scatter sinogram generator by training the preliminary scatter sinogram generator using the plurality of training samples according to the second gradient descent algorithm and the second learning rate.

17. A method for positron emission tomography (PET) image reconstruction, comprising:

obtaining PET data of a subject, the PET data being associated with a plurality of coincidence events, the plurality of coincidence events including scattering events and true coincident events;

generating, based on the PET data, a preliminary scatter sinogram relating to the scattering events and a true sinogram relating to the true coincident events and the scatter events;

generating, based on the preliminary scatter sinogram and the true sinogram, an input of a scatter sinogram generator, the scatter sinogram generator being a trained machine learning model;

determining a target scatter sinogram relating to the scattering events by inputting the input into the scatter sinogram generator, the target scatter sinogram having a higher image quality than the preliminary scatter sinogram; and reconstructing, based on the PET data and the target scatter sinogram, a target PET image of the subject.

18. The method of claim 14, wherein the generating the scatter sinogram generator by training a preliminary model using the plurality of training samples comprises:

for each of the plurality of training samples, generating an input based on the sample preliminary scatter sinogram and the sample true sinogram of the training sample; and generating the scatter sinogram generator by training the preliminary model using the input and the sample target scatter sinogram of each of the plurality of training samples.

* * * * *